United States Patent
Wigren et al.

(10) Patent No.: US 10,944,678 B2
(45) Date of Patent: Mar. 9, 2021

(54) ROUND TRIP TIME SKEW CONTROL METHODS AND ARRANGEMENTS

(71) Applicant: Telefonaktiebolaget LM Ericsson (publ), Stockholm (SE)

(72) Inventors: Torbjörn Wigren, Uppsala (SE); Katrina Lau, Wallsend (AU); Richard Middleton, North Lambton (AU); Ramon Alejandro Delgado Pulgar, Elermore Vale (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 185 days.

(21) Appl. No.: 16/306,534

(22) PCT Filed: Jul. 1, 2016

(86) PCT No.: PCT/SE2016/050681
§ 371 (c)(1),
(2) Date: Nov. 30, 2018

(87) PCT Pub. No.: WO2018/004412
PCT Pub. Date: Jan. 4, 2018

(65) Prior Publication Data
US 2019/0306066 A1    Oct. 3, 2019

(51) Int. Cl.
*H04L 12/801* (2013.01)
*H04L 12/26* (2006.01)
(Continued)

(52) U.S. Cl.
CPC .......... *H04L 47/15* (2013.01); *H04L 43/0864* (2013.01); *H04W 28/0284* (2013.01); *H04W 28/10* (2013.01)

(58) Field of Classification Search
CPC ...... E21B 41/0092; E21B 43/24; E21B 49/00; G01V 11/00; G01V 1/282; G06F 17/11;
(Continued)

(56) References Cited

U.S. PATENT DOCUMENTS

2002/0160744 A1*  10/2002  Choi ................... H04B 7/2628
                                                                455/403
2006/0233116 A1   10/2006  Kyusojin et al.
(Continued)

FOREIGN PATENT DOCUMENTS

EP         2916521 A1       9/2015
JP       2014-229956 A     12/2014
(Continued)

OTHER PUBLICATIONS

International Search Report and Written Opinion for Application No. PCT/SE2016/050681, dated Jul. 1, 2016, 11 pages.
(Continued)

*Primary Examiner* — Omar J Ghowrwal
*Assistant Examiner* — Kokou E Detse
(74) *Attorney, Agent, or Firm* — NDWE LLP

(57) ABSTRACT

A method for assisting in multipoint data flow control in a wireless communication system having a number, n+1, where n≥1, of wireless-transmission points. The method comprises obtaining, for each of the wireless-transmission points, a round trip time of a present sampling period for data travelling to a user equipment via a respective wireless-transmission point and an acknowledge message travelling back. A round trip time skew is computed for the present sampling period for individual wireless-transmission points. The round trip time skew is a difference between the obtained round trip time of a respective wireless-transmission point and a reference value. A reference round trip time value is provided for each wireless-transmission point in
(Continued)

dependence of the round trip time skews. A rate control signal is generated, for each of the wireless-transmission points, in dependence of a respective reference round trip time value. Corresponding arrangements are also disclosed.

14 Claims, 20 Drawing Sheets

(51) Int. Cl.
*H04W 28/10* (2009.01)
*H04W 28/02* (2009.01)

(58) Field of Classification Search
CPC ..... G06F 30/20; H04L 43/0864; H04L 47/15; H04W 28/0284; H04W 28/10
USPC .......................................................... 370/235
See application file for complete search history.

(56) References Cited

U.S. PATENT DOCUMENTS

| | | | |
|---|---|---|---|
| 2011/0239226 A1* | 9/2011 | Placanica | H04L 47/283 719/313 |
| 2012/0158957 A1* | 6/2012 | Nakayama | H04L 43/0864 709/224 |
| 2014/0098770 A1* | 4/2014 | Zhou | H04L 1/1887 370/329 |
| 2014/0226481 A1* | 8/2014 | Dahod | H04W 72/04 370/235 |
| 2015/0334630 A1 | 11/2015 | McTernan et al. | |

FOREIGN PATENT DOCUMENTS

| | | |
|---|---|---|
| WO | 9320637 A1 | 10/1993 |
| WO | 2011/093074 A1 | 8/2011 |
| WO | 2014/069642 A1 | 5/2014 |
| WO | 2014207494 A1 | 12/2014 |
| WO | 2016/067437 A1 | 5/2016 |

OTHER PUBLICATIONS

D. Sandberg and T. Wigren, "Multi-rate Uplink Channel Prediction and Enhanced Link Adaptation for VoLTE," Sep. 6, 2015, 5 pages, 2015 IEEE 82nd Vehicular Technology Conference (VTC2015—Fall).
Torbjorn Wigren, "Robust L2 Stable Networked Control of Wireless Packet Queues in Delayed Internet Connections," Mar. 2016, pp. 502-513, IEEE Transactions on Control Systems Technology, vol. 24, No. 2.
International Preliminary Report on Patentability, PCT App. No. PCT/SE2016/050681, dated Jan. 10, 2019, 8 pages.
Notice of Reasons for Rejection, JP App. No. 2018-568935, dated Dec. 24, 2019, 9 pages (4 pages of English Translation and 5 pages of Original Document).
Communication pursuant to Article 94(3) EPC, EP App. No. 16745209.3, dated Jun. 12, 2020, 4 pages.
Decision to Grant, JP App. No. 2018-568935, Apr. 1, 2020, 5 pages (2 pages of English Translation and 3 pages of Original Document).

* cited by examiner

ROUND TRIP TIME SKEW CONTROL METHODS AND ARRANGEMENTS

CROSS-REFERENCE TO RELATED APPLICATIONS

This application is a National stage of International Application No. PCT/SE2016/050681, filed Jul. 1, 2016, which is hereby incorporated by reference.

TECHNICAL FIELD

The proposed technology generally relates to wireless communication systems and methods, and in particular to multipoint transmission control methods and arrangements.

BACKGROUND

Today's wireless cellular systems have been designed to handle very efficient data transfer between a single user equipment (UE) and a single base station, denoted eNB in fourth generation (4G) systems. These solutions are sufficient at today's carrier frequencies close to 1-2 GHz. In future fifth generation cellular system (5G) a shift towards higher carrier frequencies is a necessity, to be able to utilize the available spectrum, thereby achieving a higher capacity overall.

A consequence of the move to higher carrier frequencies is that the radio propagation is transformed from "diffuse" scattering to beamlike propagation. This leads to sharp diffraction effects and increasingly heavy radio shadowing behind obstacles. This makes it more difficult to obtain uniform coverage from a single 5G base station (denoted eNB in case of Long Term Evolution (LTE) and NR in case of the new access discussed for 5G at higher carrier frequencies). The implication is a need to transmit from multiple, non-co-located transmit points to cover a single cell. Such massive multi-point transmission is generally considered to become a cornerstone in future 5G radio access.

It should be noted that multi-point transmission is also considered for the present 4G LTE system, however the need and also the massiveness of the solutions for 4G are believed to be less than those of future 5G cellular systems.

In the ongoing standardization of 5G wireless systems, so called critical machine type communications (C-MTC) use cases are an important ingredient. Typical such use cases include closed loop feedback control over 5G wireless, for control of systems and processes with very high performance requirements in terms of one or more of a number of performance indicators, like latency and bit error rate. Examples include industrial robots in manufacturing plants, where sampling rates much above 1 kHz is needed, together with loop delays below 1 ms. Such performance is not possible with today's 4G cellular or WIFI systems, therefore a new air interface is needed. Another example is the so called 'haptic wireless internet' where haptic feedback to e.g. joysticks and manipulators are sent back and applied to a remote user, e.g. performing remote surgery, participating in advanced video games or similar virtual reality (VR) applications.

The key aspect of C-MTC that is relevant to the present technology is the desired ability to guarantee a loop delay, i.e. a round trip latency, uniformly from a single point over multiple transmit points to a UE, at the higher carrier frequencies of future 5G wireless systems. Since the data is split and sent over multiple transmit points to the end user, it follows that also the round trip time (RTT) for the different transmit paths needs to be controlled to be consistent with the overall control objective and to always sustain a uniform sampling rate. The reason may be the result of e.g. varying queuing delays in the wireless transmission node, e.g. the eNB, varying radio link quality, causing wireless transmission node buffer size variation or retransmissions.

The number of users and thereby data flows is expected to increase very significantly in 5G systems, as compared to present 4G systems. This means that the number of controller algorithm instances will also increase significantly. As a consequence the processing requirements need to be small, for the selected controller algorithm.

Since certain types of applications like robotic control over wireless does require a much reduced latency as compared to present 4G systems, the consequence is that the faster transmit paths need to wait for the slower ones if prior art solutions are used. This is detrimental for capacity, stability and performance in general.

Furthermore, when supporting C-MTC, the transmission controller and its parts need to have well defined stability properties.

SUMMARY

It is an object to provide methods and arrangements that allows for a safe operation of e.g. C-MTC applications or similar time-critical applications.

This and other objects are met by embodiments of the proposed technology.

According to a first aspect, there is provided a method for assisting in multipoint data flow control in a wireless communication system having a number, n+1, where n≥1, of wireless-transmission points. The method comprises obtaining, for each of the wireless-transmission points, a round trip time of a present sampling period for data travelling to a user equipment via a respective wireless-transmission point and an acknowledge message travelling back via the respective wireless-transmission point. A round trip time skew is computed for the present sampling period for individual wireless-transmission points. The round trip time skew is a difference between the obtained round trip time of a respective wireless-transmission point and a reference value. A reference round trip time value is provided for each of the wireless-transmission points in dependence of the computed round trip time skews. A rate control signal is generated, for each of the wireless-transmission points, in dependence of a respective reference round trip time value.

According to a second aspect, there is provided a method for multipoint data flow control in a wireless communication system having a number, n+1, where n≥1, of wireless-transmission points. The method comprises obtaining, for each of the wireless-transmission points, a rate control signal, by a method according to the first aspect. Data is transmitted to each of the wireless-transmission points according to respective rate control signal.

According to a third aspect, there is provided a method for assisting in multipoint data flow control in a wireless communication system. The method comprises obtaining, in a wireless-transmission point, an air interface rate for a wireless interface between the wireless-transmission point and a user equipment. In the wireless-transmission point, feedback information is obtained associated with sequence numbers of acknowledged data items. Data representing the air interface rate and the feedback information is provided to a controller node. Data is received from the controller node according to a rate control signal deduced from the air interface rate and the feedback information. Transmissions of the received data to the user equipment are performed according to the air interface rate.

According to a fourth aspect, there is provided a controller node configured to assist in multipoint data flow control in a wireless communication system having a number, n+1, where n≥1, of wireless-transmission points. The controller node is configured to obtain, for each of the wireless-transmission points, a round trip time of a present sampling period for data travelling to a user equipment via a respective wireless-transmission point and an acknowledge message travelling back via the respective wireless-transmission point. The controller node is configured to compute a round trip time skew for the present sampling period for individual wireless-transmission points. The round trip time skew is a difference between the obtained round trip time of a respective wireless-transmission point and a reference value. The controller node is configured to provide a reference round trip time value for each of the wireless-transmission points in dependence of the computed round trip time skews. The controller node is configured to generate, for each of the wireless-transmission points, a rate control signal in dependence of a respective the reference round trip time value.

According to a fifth aspect, there is provided a wireless-transmission point in a wireless communication system. The wireless-transmission point is configured to obtain an air interface rate for a wireless interface between the wireless-transmission point and a user equipment. The wireless-transmission point is configured to obtain feedback information associated with sequence numbers of acknowledged data items. The wireless-transmission point is configured to provide data representing the air interface rate and the feedback information to a controller node. The wireless-transmission point is configured to receive data from the controller node according to a rate control signal deduced from the air interface rate and the feedback information. The wireless-transmission point is configured to perform transmissions of the received data to the user equipment according to the air interface rate.

According to a sixth aspect, there is provided a computer program comprising instructions, which when executed by at least one processor, cause the processor(s) to obtain, for each of a number, n+1, where n≥1, of wireless-transmission points in a wireless communication system, a round trip time of a present sampling period for data travelling to a user equipment via a respective wireless-transmission point and an acknowledge message travelling back via the respective wireless-transmission point. The computer program comprising further instructions, which when executed by the processor(s), cause the processor(s) to compute a round trip time skew for the present sampling period for individual wireless-transmission points. The round trip time skew is a difference between the obtained round trip time of a respective wireless-transmission point and a reference value. The computer program comprising further instructions, which when executed by the processor(s), cause the processor(s) to provide a reference round trip time value for each of the wireless-transmission points in dependence of the computed round trip time skews. The computer program comprising further instructions, which when executed by the processor(s), cause the processor(s) to generate, for each of the wireless-transmission points, a rate control signal in dependence of a respective reference round trip time value.

According to a seventh aspect, there is provided a computer program comprising instructions, which when executed by at least one processor, cause the processor(s) to obtain an air interface rate for a wireless interface between a wireless-transmission point and a user equipment. The computer program comprises further instructions, which when executed by the processor(s), cause the processor(s) to obtain feedback information associated with sequence numbers of acknowledged data items. The computer program comprises further instructions, which when executed by the processor(s), cause the processor(s) to provide data representing the air interface rate and the feedback information to a controller node. The computer program comprises further instructions, which when executed by the processor(s), cause the processor(s) to receive data from the controller node according to a rate control signal deduced from the air interface rate and he feedback information. The computer program comprises further instructions, which when executed by the processor(s), cause the processor(s) to perform transmissions of the received data to the user equipment according to the air interface rate.

According to an eighth aspect, there is provided a computer-program product comprising a computer-readable medium having stored thereon a computer program according to the sixth or seventh aspect.

According to a ninth aspect, there is provided a carrier comprising the computer program according to the sixth or seventh aspect, wherein the carrier is one of an electronic signal, an optical signal, an electromagnetic signal, a magnetic signal, an electric signal, a radio signal, a microwave signal, or a computer-readable storage medium.

According to a tenth aspect, there is provided a controller node for assisting in multipoint data flow control in a wireless communication system having a number, n+1, where n≥1, of wireless-transmission points. The controller node comprises an obtaining module for obtaining, for each of the wireless-transmission points, a round trip time of a present sampling period for data travelling to a user equipment via a respective wireless-transmission point and an acknowledge message travelling back via the respective wireless-transmission point. The controller node further comprises a computing module for computing a round trip time skew for the present sampling period for individual wireless-transmission points. The round trip time skew is a difference between the obtained round trip time of a respective wireless-transmission point and a reference value. The controller node further comprises a reference value providing module for providing a reference round trip time value for each of the wireless-transmission points in dependence of the computed round trip time skews. The controller node further comprises a generating module for generating, for each of the wireless-transmission points, a rate control signal in dependence of a respective the reference round trip time value.

According to a twelfth aspect, there is provided a wireless-transmission point in a wireless communication system. The wireless-transmission point comprises an obtaining module for obtaining an air interface rate for a wireless interface between the wireless-transmission point and a user equipment and feedback information associated with sequence numbers of acknowledged data items. The wireless-transmission point further comprises a providing module for providing data representing the air interface rate and the feedback information to a controller node. The wireless-transmission point further comprises a receiver module for receiving data from the controller node according to a rate control signal deduced from the air interface rate and the feedback information. The wireless-transmission point further comprises a transmitter module for performing transmissions of the received data to the user equipment according to the air interface rate.

An advantage of the proposed technology is guaranteed latency and latency differences can be achieved when 5G multi-point transmission is used, e.g. for C-MTC. Flow control is furthermore consistent with the 5G concept of ultra-lean transmission. Very good stability properties enables the application of globally unconditionally stable window based inner loop single leg control.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of a multi-transmission system and multipoint flow control basics.

In a massive multi-point transmission system, where data is arriving from uplink nodes, each involved transmit point needs to be given access to at least portions of this data, for transmission over the wireless interface. In e.g. C-MTC applications the data is closely related to data simultaneously being transmitted from other transmit points.

It should here be noted that the different transmit points may transmit different data, or the same data for diversity gain, or a mix of these alternatives.

Figure 1:
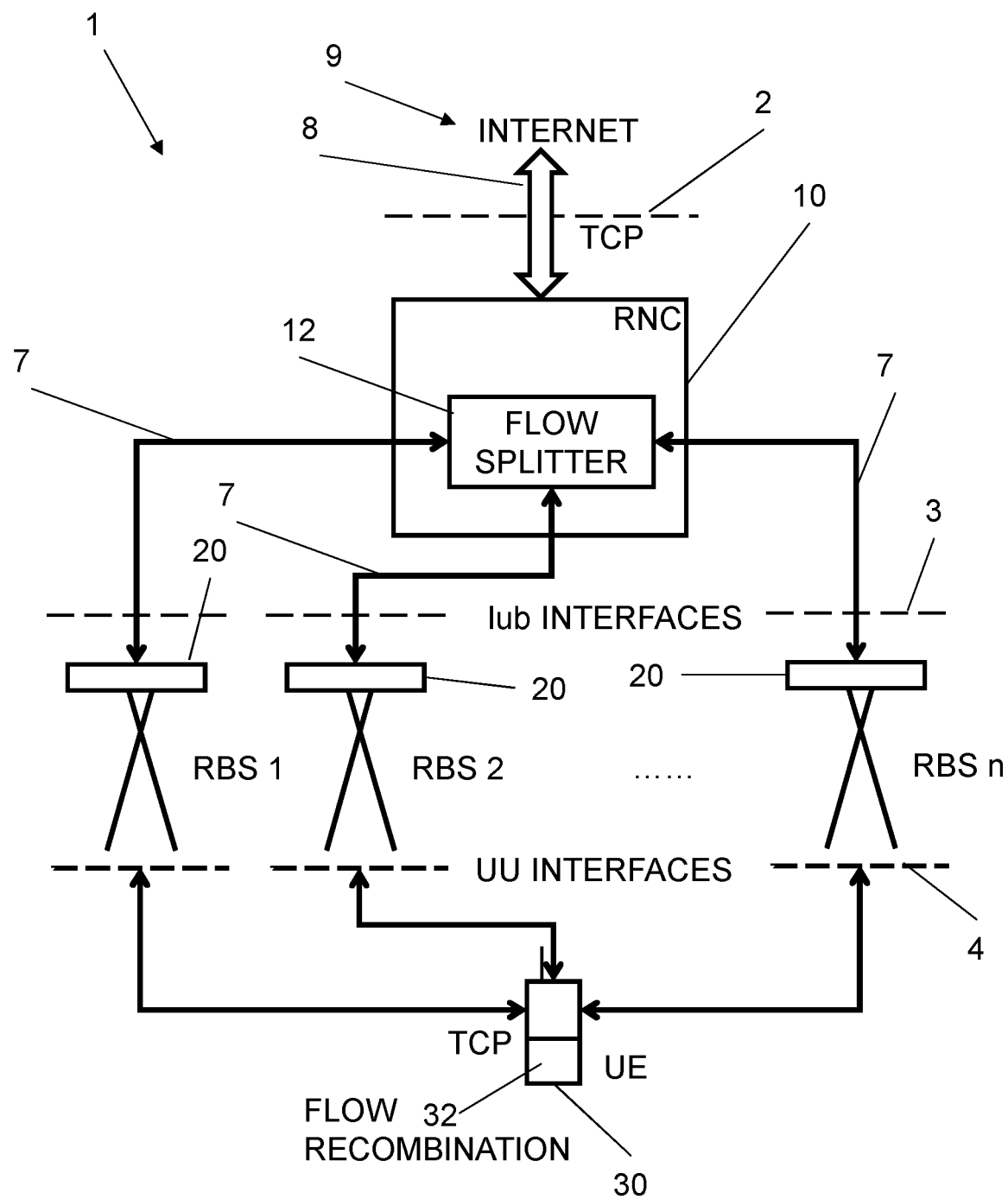
FIG. 1 is an illustration of a multipoint flow control architecture.

One mechanism for achieving multi-point transmission in prior art is illustrated in FIG. 1, comprising splitting and recombination of a single flow via multiple flows at the physical layer. That figure depicts an architecture of the existing prior art 3G WCDMA system. Similar architectures in 4G and 5G could involve nodes from both the radio access network (RAN) and the core network (CN).

Data 8 from the Internet 9 is received over a Transmission Control Protocol (TCP) interface 2 by a flow splitter 12 of a Radio Network Controller (RNC) 10. This data 8 will in the best case be an ordered set of packets that need to be transmitted to a UE 30. The data 8 is split by the flow splitter 12 into a number of individual flows 7 of packets, provided to a multitude of transmit nodes or wireless-transmission points 20, typically Radio Base Stations (RBS), e.g. NodeBs, over an Iub Interface 3. The RBSs 20 transmits the packets by radio signals over UU interfaces 4 to the UE 30.

In the UE 30, a recombiner 32 performs a flow recombination. However, due to non-uniform and varying delays in the individual flows 7, the packets received by the UE 30 will in general be out of order. The delay variations that cause the out-of-ordering may be the result of:

Varying queuing delays in the RBS,

Varying transport network delays, e.g. due to congestion, and/or

Varying radio link quality, causing RBS buffer size variation.

A first task of a packet scheduler of the flow splitter 12 is to determine the amount of packets from the packet queue of the data 8 that are to be sent on at the present time, at each output of the flow splitter 12. Here, so-called rate shaping may be used, meaning that the packets are sent over a specified time interval with a selected bit rate or packet rate. A motivation for this is provided by information theory, where Shannon's famous result proves that every channel is associated with a maximum rate that allows error free data transfer.

The packet scheduler may also decide, or use external decisions, on the priority path of certain types or classes of packets. It may e.g. always schedule high priority packets via the packet path with the lowest latency to the end user.

The packet scheduler may also decide, or use decisions, on diversity transmission, thereby duplicating a packet and scheduling multiple packet copies over several different flows 7. This of course increases the chances of error free reception of the information of said duplicated package, at the receiving end. Diversity transmission could also be achieved over one path, by scheduling copies of the same packets over the same path, but at different times. The chances of good channel conditions for at least one copy of said duplicated packet thereby increases, which in turn increases the probability of correct reception of the information of the duplicated package at the receiving end.

It is stressed that it is the package scheduler of the flow splitter 12 that is responsible for the transmission of packets from the, possibly virtual, node where it resides, in this particular example the RNC 10.

The basics of the automatic control terminology used in the present disclosure are explained in Appendix A. It is stressed that this terminology is part of the prior art in the field of automatic control.

To explain the problem with existing solutions the so called control objective needs to be defined, i.e. the question of what needs to be controlled to meet the purpose of the controller. The focus of the technology presented here is to provide automatic controller algorithms that guarantee a maximum loop delay, also denoted as round trip latency. Since the data is split and sent over multiple transmit points to the end user, it follows that also the difference in round trip time (RTT) needs to be controlled, in order to be consistent with the control objective and to always sustain a uniform sampling rate. This concept is here denoted round trip time skew control. Note that because of varying delays it is not at all evident that round trip time skew is minimized, even when round trip latencies are individually small enough for each path. This may be the result of varying queuing delays in the eNB, varying radio link quality, causing eNB buffer size variation or the occurrence retransmissions.

When discussing general multipoint data flow control, one possible idea would be to use a different control objective, namely UE time of arrival skew control. Such a control objective relates to synchronization of received mobile broadband data in the UE. However, data being synchronized does not have to be provided within a specified time, which makes such a control objective less suitable for e.g. latency-critical applications. To combat latency-critical problems it is not solely the time of arrival difference in the UE that matters, but rather the round trip latency differences.

As briefly mentioned above, one aspect that has to be addressed by any round trip time skew control solution is that the number of users and thereby data flows is expected to increase very significantly in 5G systems, as compared to present 4G systems. This means that the number of controller algorithm instances will also increase significantly. As a consequence the processing requirements need to be small, for the selected controller algorithm.

As also mentioned above, certain types of applications like robotic control over wireless does require a much reduced latency as compared to present 4G systems. In case time alignment in the UE is to be achieved by prior art algorithms, the consequence is that the faster transmit paths need to wait for the slower ones. This means that the worst connection path would be allowed to dominate the better ones, a fact that is not advantageous for capacity, stability and performance in general.

Furthermore, C-MTC applications depend heavily on the stability of the control system. The stability of a feedback control system is a very important property. If a system is stable, this means that internal and external signals affecting the performance remain bounded and are not subject to sustained oscillation, both cases resulting in at best poor performance and often in complete failure of the system. Stability is hence not a theoretical subject, but a property that guarantees that the feedback control system cannot malfunction in certain ways.

Stability can be local, meaning that the feedback control system is stable in a surrounding of an operating point. The preferred case is however global stability, in which the feedback control system is guaranteed to be stable irrespective of the operating point.

It is thus a request for a wireless flow control, supporting C-MTC, that the round trip time skew controller and its parts have well defined stability properties.

The present disclosure therefore outlines new techniques to regulate the round trip time skew, as seen in a controlling node that may be separate from the wireless-transmission point nodes. The round trip time, also denoted loop delay, defines the objective. This is an important aspect when designing multi-point flow controllers for 5G C-MTC. It will be seen below that it may in different embodiments affect all aspects from the type of feedback information needed to the selection of the controller algorithms.

Figure 4:
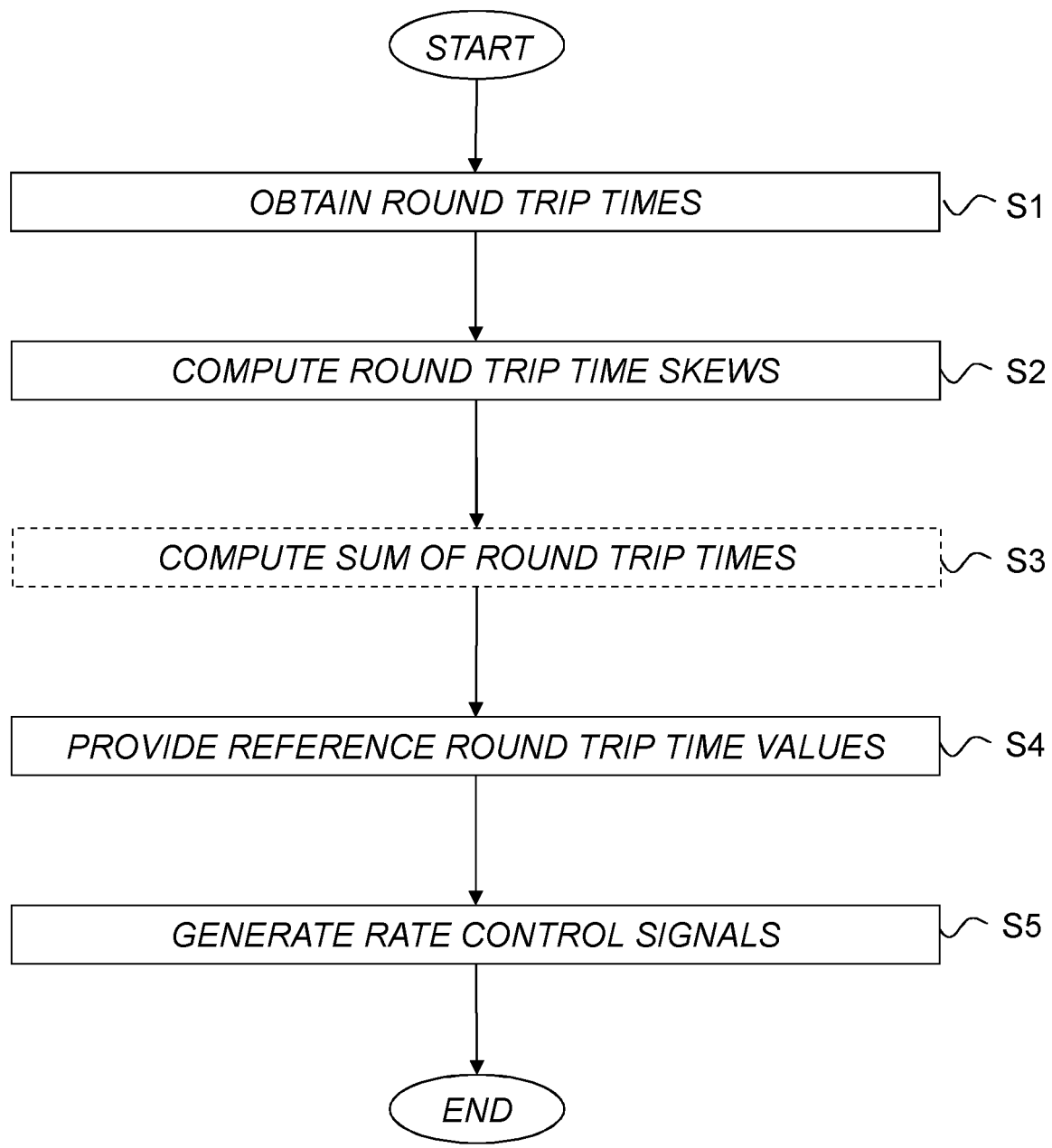
FIG. 4 is a flow diagram illustrating steps of an embodiment of a method for assisting in multipoint data flow control.

FIG. 4 is a flow diagram illustrating steps of an embodiment of a method for assisting in multipoint data flow control in a wireless communication system. The wireless communication system having a number, n+1, of wireless-transmission points. The number n≥1, which means that the total number of wireless-transmission points is at least two. In step S1, for each of the wireless-transmission points, a round trip time of a present sampling period is obtained for data travelling to a user equipment via a respective wireless-transmission point and an acknowledge message travelling back via the respective wireless-transmission point. Further below, a preferred embodiment of the obtaining of round trip times will be discussed more in detail. However, in the general method for assisting in multipoint data flow control, the details of exactly how the round trip times are achieved are not of crucial importance for the main control method to operate. There are therefore many other possible procedures to obtain the round trip times that can be utilized together with the main method. The essential feature is, however, only that the round trip times represent a present sampling period and is obtained for data travelling to the user equipment via a respective wireless-transmission point and an acknowledge message travelling back via the respective wireless-transmission point.

In line with the present description, separate round trip times are experienced for data travelling to each of the wireless-transmission points, and for acknowledgement messages travelling back to the controlling node. Each of these round trip times may typically comprise a sum of a downlink backhaul interface delay, a transmit queue dwell time delay, a UE processing delay and an uplink backhaul interface delay. Note that not all parts of this sum have to be included in a specific embodiment.

The involved nodes could be interpreted as logical nodes that may or may not be implemented in the same physical node. Very often the uplink and downlink travel time for data and acknowledgement messages are almost symmetric. Then the time skew experienced by the UE will be close to half the round trip time skew.

In step S2, a round trip time skew is computed. The round trip time skew is defined as a difference between the obtained round trip time of a respective wireless-transmission point and a reference value. The round trip time skew is computed for the present sampling period for individual wireless-transmission points.

In one embodiment, a round trip time skew is computed for each of the wireless-transmission points. The reference value is then selected to be less than the maximum allowed latency at the end user. Preferably, the reference value is selected to be lower than the maximum allowed latency by a safety margin equal to the maximum latency variation foreseen. This bounding procedure can ensure that the latencies over all transmission points remain within allowed latency specifications.

However, in cases where a significantly higher latency can be tolerated, such an approach may not be the most efficient, since it does not allow the round trip time to vary while keeping the round trip time skew relative to the other wireless-transmission points within requested limits.

In another embodiment, a particular wireless-transmission point is selected as a reference wireless-transmission point. The reference value is then selected to be the obtained round trip time of that reference wireless-transmission point. This means that the round trip time skew becomes a difference between the obtained round trip time of a respective wireless-transmission point and the obtained round trip time of the reference wireless-transmission point. Since the round trip time skew computed in such a way becomes equal to zero for the reference wireless-transmission point at all times, that round trip time skew becomes superfluous. In other words, the round trip time skews are computed for each wireless-transmission point except for the reference wireless-transmission point. Since the total number of wireless-transmission points is n+1, the number of round trip time skews are n. This reduction of control objects opens up for additional control objects, as will be described further below.

In step S4, a reference round trip time value for each of the wireless-transmission points, including any reference wireless-transmission point, is provided. This provision is performed in dependence of the computed round trip time skews. A variety of control mechanisms can be applied, of which a part is known as such in prior art. In a typical embodiment, the step S4 of providing a reference round trip time value is performed under a constraint of controlling each of the round trip time skews towards zero. Preferred embodiments are further discussed below.

Step S4 achieves a decoupling between the flow-controlled paths. The round trip time skews are interrelated quantities representing the relation between the respective operation of the different wireless-transmission points. However, by re-combining the information on how these interrelated quantities are requested to be controlled, requested behaviour of decoupled wireless-transmission point specific quantities can be obtained. The effect is to simplify high performance control, by reducing the inter-path coupling, thereby enabling reference round trip time skew tracking and backhaul latency disturbance rejection.

In step S5, a rate control signal is generated for each of the wireless-transmission points, including any reference wireless-transmission point, in dependence of a respective reference round trip time value. The rate control signal can be generated by mechanisms, known as such in prior art. Preferred embodiments are discussed in more detail further below.

Since the reference round trip time value for each wireless-transmission point is independent of the other reference round trip time values, the operation can be performed individually for each wireless-transmission point. The round trip time skew controller may preferably use window based inner loop controllers for each wireless-transmission point. These inner loop controllers have recently been proved to be globally stable, irrespective of the loop delay they experience, which will be discussed further below. This is a huge engineering advantage since the control loop can never malfunction algorithmically, irrespective of the tuning.

The approach described here above furthermore opens up for implementations of the round trip time skew controller with low real time computational complexity.

In one embodiment, the method for assisting in multipoint data flow control in a wireless communication system comprises a step S3, in which a sum of the round trip times of the wireless-transmission points for the present sampling period is computed. This is preferably used together with the embodiment of the round trip time skew computation using a reference wireless-transmission point. The step S4 of providing reference round trip time values therefore in such an embodiment preferably comprises providing of the reference round trip time value in further dependence of the computed sum of the round trip times.

This provision of reference round trip time values may in a particular embodiment be performed by setting of a reference value for the computed sum of the round trip times. This reference value is selected to be lower than the maximum allowed latency at the end user multiplied with the number of wireless-transmission points. The reference value is preferably selected with a safety margin to that maximum allowed latency at the end user multiplied with the number of wireless-transmission points, e.g. depending on the maximum latency variation foreseen. The provision of reference round trip time values thus also comprise providing of the respective reference round trip time values under a constraint of controlling the sum of the round trip times towards the reference value.

The regulation of round trip time skew allows for a split of an incoming data flow in the controlling node, to multiple wireless-transmission points in the same and/or other nodes, while keeping the round trip time differences within specified limits.

Since the backhaul delays between multiple transmit points may differ, the round trip time skew controller thus ensures that the timing skews between transmit paths experienced in the controlling node are all within pre-specified limits. Interval control is allowed, but most often time skews are steered towards 0 unless there are more than one bandwidth requirement for the controlled process. In a preferred embodiment the regulation is performed per bearer. In another embodiment aggregates of bearers may be used.

A special feature of the invention is that it is developed for an arbitrary number (n+1) of transmit nodes or wireless-transmission points. This is crucial in 5G cellular since the number of transmit nodes are likely to exceed beyond the 2-node master and slave configuration.

In C-MTC, which is the main scope and use case of the invention, the round trip time skew is typically steered towards zero. This is so since the served control loop applications are normally based on periodic sampling and then zero time skew between e.g. control signals sent over different transmit nodes require zero round trip time skew. In such implementations, the round trip time skews are controlled to be within a specified interval, in this case preferably an interval that is zero.

There are however also other embodiments where processes with different inherent speed, i.e. bandwidth, are to be controlled in the same process. In such cases the control of the faster parts of the process can in general tolerate less latency than the slower part, therefore different round trip targets may be needed. In such cases there is hence a need to set reference time skew values that are different from 0.

For other implementations that are less time critical and may allow for a packet re-ordering buffer in the UE, the constraints are somewhat relaxed. The round trip time skew then needs to be constrained to an interval of time that is no wider than the time covered by the re-ordering buffer.

A critical consequence of the control objective and the steering of round trip time skew towards zero, or other preferred values, is that more freedom may be needed to handle cases where the delay over a transmission point changes. This follows since the queue dwell times of all other transmit nodes then also may need to change in order for the round trip time skews to adjust. This is allowed by including the control channel of the sum of round trip times in the preferred solution. This inclusion may in different implementations operate as such.

However, for example in embodiments where there is a large variation in e.g. the downlink backhaul interface delay, and/or the uplink backhaul interface delay, such variations may lead to requests for negative round trip time skews due to the constraints of the sum of round trip times. In such embodiments, the sole incorporation of the sum of round trip times as a control channel may not work in an optimal way. One possible new trick for such a case is therefore to use a deadzone on the control error for this channel of the sum of round trip times. The width of the deadzone is typically selected to n times the maximum latency variation foreseen, where n is the number of transmit node. With such a relaxation of the constraints, the risk for negative skew values are removed or at least considerably reduced.

In other words, the step S4 of providing reference round trip time values further comprises refraining from controlling of the sum of the round trip times if the sum of the round trip times lies within a predefined deadzone for the reference value for the computed sum of the round trip times.

Alternative solutions are also possible, which will be described further below.

Figure 5:
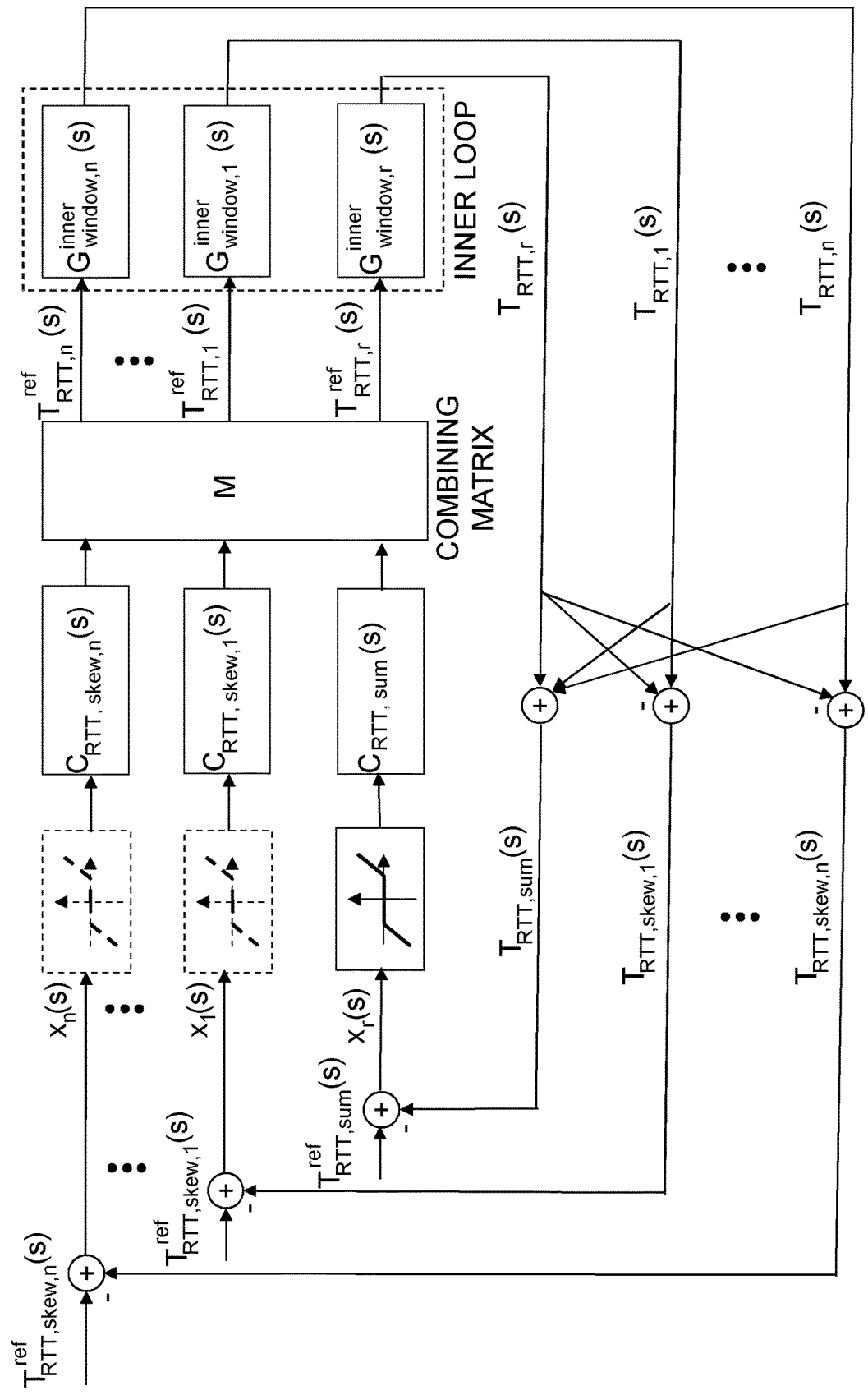
FIG. 5 is a block diagram of functionalities of an embodiment of an arrangement for multipoint data flow control.

One embodiment of the approach described here above is depicted in FIG. 5. A new feedback loop is described for the case with n transmit points, and for one bearer. The generalization to more than 1 bearer is trivial since this generalization is obtained by setting up another instance of the functionality described below. In this context, a bearer may be thought of as supporting a flow of data packets belonging to an IP connection.

An outer feedback loop is depicted in FIG. 5 as a block diagram. The block diagram describes the loop in case of n+1 nodes.

The components can be explained as follows.

$T_{RTT,skew,i}^{ref}(s)$ is the Laplace transform of the reference value for the round trip time skew, typically 0, i=1, ..., n.

$T_{RTT,sum}^{ref}(s)$ is the Laplace transform of the reference value for the sum of round trip time delays.

$C_{RTT,skew,i}(s)$ is the transfer function of one of the feedback controllers for the round trip time skew control channels, i=1, ..., n.

$C_{RTT,sum}(s)$ is the transfer function of the feedback controller for the round trip delay sum channel.

$T_{RTT,i}^{ref}(s)$ is the Laplace transform of the reference round trip time value for the inner feedback control loop for slave node i, i=1, ..., n and for slave node r.

$G_{window,i}^{inner}(s)$ is the transfer function used for modelling of the inner closed loop controller dynamics for slave node i, i=1, ..., n, and for slave node r.

$T_{RTT,i}(s)$ is the Laplace transform of the round trip delay of the queue of slave node i, as controlled by the inner loop controller, i=1, ..., n, and for slave node r.

$T_{RTT,skew,i}(s)$ is the Laplace transform of the time skew signal of node i, with reference to path r, i=1, ..., n.

$T_{RTT,sum}(s)$ is the Laplace transform of the signal describing the sum of downlink time delays.

$x_i(s)$ is the signal occurring before the controller filters, i=1, ..., n, and similarly for path r.

M is a combining matrix that combines input signals into output signals in a way that is a key aspect of the invention, described below.

If the flow is followed starting from the lower right part of FIG. 5, the round trip times associated with the n+1 wireless-transmission points, i.e. 1 ... n and r, are available. Round trip time skews are produced for n of the wireless-transmission points, relative to the reference wireless-transmission point, r. The sum of all round trip times is also produced. Each round trip time skew is compared with a reference value, typically the same value for all each round trip time skew, and also typically equal to 0.

Also the sum of all round trip times is compared with a reference sum value or a setpoint. This reference sum value allows regulation of the absolute latency of the paths. An increased value can be used to ensure that data is available for transmission over all active links, thereby potentially avoiding dropped links in case of piggy backed control information in the ultra-lean transmission anticipated for 5G. In the present embodiment, a deadzone is arranged for to be situated immediately after the summation point. This sum channel deadzone application is preferably used in e.g. C-MTC applications.

Note that the round trip time skew deadzones, illustrated in FIG. 5 by dotted lines, are optional and are not needed in most C-MTC applications The differences between the round trip time skew and the reference value for the round trip time skew, typically 0, is used as input to the transfer function of a respective one of the feedback controllers for the round trip time skew control channel. Filtered round trip time skew errors are typically found in this way, as described here below. Similarly, the difference between the round trip time sum and the reference value for the round trip time sum is used as input to the transfer function of the feedback controller for the round trip time sum control channel. This sum control channel may be used to ensure that data is available for transmission over all links that are desired to be active. This addresses the potential problem with data starvation in case of ultra-lean transmission. A filtered round trip time sum error is typically found in this way, as described here below. These filtered skew errors and sum error are combined in a combining matrix into individual reference round trip time values for all n+1 wireless-transmission points, i.e. also for the reference wireless-transmission point.

The reference round trip time values are used as input parameters for the inner loop, a preferred embodiment of which will be further described below.

The inner loop again provides the round trip times associated with the n+1 wireless-transmission points again.

Figure 6:
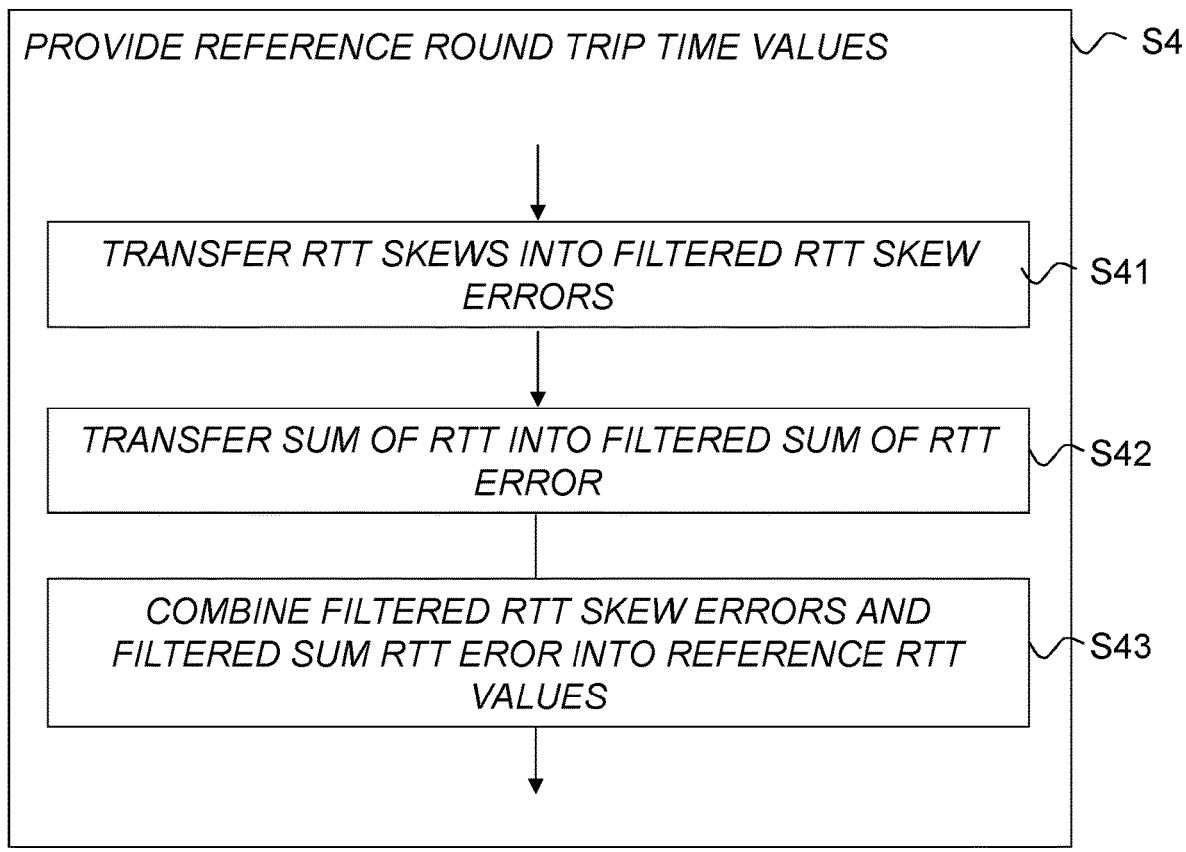
FIG. 6 is a part flow diagram illustrating part steps of an embodiment of a reference round trip time value providing step.

The function of the provision of the reference round trip time values for each of the wireless-transmission points is further described in FIG. 6. Here, steps of one embodiment of Step S4 of FIG. 4 are illustrated. In step S41, the computed round trip time skews are transferred into filtered round trip time skew errors. Typically, the round trip time skews are first subtracted from a respective round trip time skew reference value, to form a control error signal (cf.

Appendix A). The respective controller filter then filters the respective control error to obtain the respective filtered round trip time skew error. In step S42, the computed sum of said round trip times is transferred into a filtered sum of round trip times error. Typically, the sum of round trip times is first subtracted from a reference value, to form a control error signal (cf. Appendix A). The round trip time sum controller filter then filters the control error to obtain the filtered sum of round trip time error.

The error signals are denoted as $x_1(s), \ldots x_n(s), x_r(s)$ in FIG. 5.

In step S43, the filtered round trip time skew errors and the filtered sum of round trip times error are combined into the reference round trip time values by a combining matrix. This combining matrix performs a static decoupling of the respective reference round trip time values.

A general problem that arises from the block diagram of FIG. 5 is that each round trip skew control loop will depend on the round trip time skew values of all other loops. This complicates controller design and may reduce regulation performance. This issue is addressed by arranging a static disturbance decoupling.

The remedy to the problem is provided by the combining matrix NI. That matrix is designed to provide decoupling between the round trip time skews and sum of round trip time loops. This decoupling is obtained as follows, using additional matrices to describe the control loop. These matrices are:

F—the matrix describing the computation of the round trip time sum and round trip time skew signals.

G(s)—The diagonal matrix of downlink inner loop transfer functions.

C(s)—The diagonal matrix of controller filters.

With these definitions the matrix relation from $x_r(s)$, $x_1(s), \ldots, x_n(s)$ to $T_{RTT,sum}(s), T_{RTR,skew,1}(S), \ldots, T_{RTT,skew,n}(S)$ then becomes:

$$\begin{pmatrix} T_{RTT,sum}(s) \\ T_{RTT,skew,1}(s) \\ \vdots \\ T_{RTT,skew,n}(s) \end{pmatrix} = FG(s)MC(s) \begin{pmatrix} x_r(s) \\ x_1(s) \\ \vdots \\ x_n(s) \end{pmatrix}. \quad (1)$$

Neglecting backhaul delays and assuming perfect inner loops, i.e. G(s)=I, where I denotes the identity matrix, gives:

$$\begin{pmatrix} T_{RTT,sum}(s) \\ T_{RTT,skew,1}(s) \\ \vdots \\ T_{RTT,skew,n}(s) \end{pmatrix} = FMC(s) \begin{pmatrix} x_r(s) \\ x_1(s) \\ \vdots \\ x_n(s) \end{pmatrix}. \quad (2)$$

This means that static disturbance decoupling should exploit the relation FM=I, i.e. $M=F^{-1}$. This follows since then the only matrix that remains in (2) is the diagonal matrix of controller filters. Since it is diagonal, the channels are decoupled.

Now, it's straightforward to derive the following matrix F from the block diagram of FIG. 5:

$$F = \begin{pmatrix} 1 & 1 & \ldots & \ldots & 1 \\ -1 & 1 & 0 & \ldots & 0 \\ -1 & 0 & 1 & \ddots & \vdots \\ \vdots & & & \ddots & 0 \\ -1 & 0 & \ldots & 0 & 1 \end{pmatrix} \quad (3)$$

A straightforward inversion then results in the disturbance decoupling combining network:

$$M = \frac{1}{n}\begin{pmatrix} 1 & -1 & \ldots & \ldots & -1 \\ 1 & n-1 & -1 & \ldots & -1 \\ 1 & -1 & n-1 & \ddots & \vdots \\ \vdots & & & \ddots & -1 \\ 1 & -1 & \ldots & -1 & n-1 \end{pmatrix} \quad (4)$$

It can be noticed that the matrix M itself only comprises sums of integer multiples of the input variables, which opens up for very efficient computation algorithms.

Figure 7:
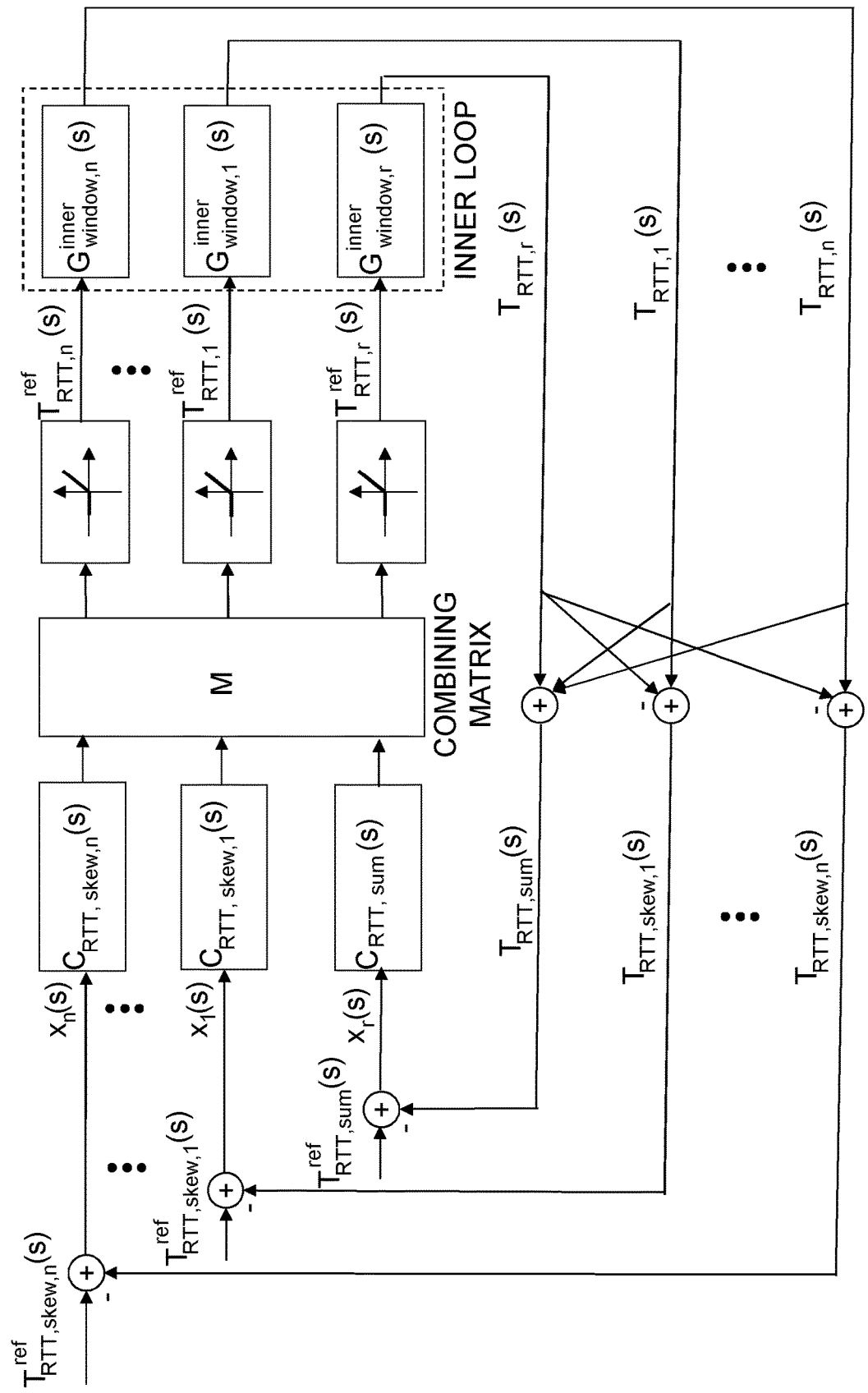
FIG. 7 is a block diagram of functionalities of another embodiment of an arrangement for multipoint data flow control.

FIG. 7 is a block diagram of another embodiment of an outer feedback loop. The basic ideas are similar as in FIG. 5. However, in this embodiment, there is no deadzone arrangement for the round trip time sum control channel. Instead, the channels are unmodified upon entry into the combining matrix. The output from the combining matrix, i.e. the reference round trip time values for all wireless-transmission points, may in certain situations comprise negative values. Therefore, the combining is complemented by a function where negative values of round trip times are replaced by zeros, while leaving the positive values unchanged.

In other words, the combining of the filtered round trip time skew errors and the filtered sum of round trip times error into the reference round trip time values further comprises setting of positive output values of the combining matrix as the reference round trip time values and adjustment of negative output values of the combining matrix into zero reference round trip time values.

Figure 8:
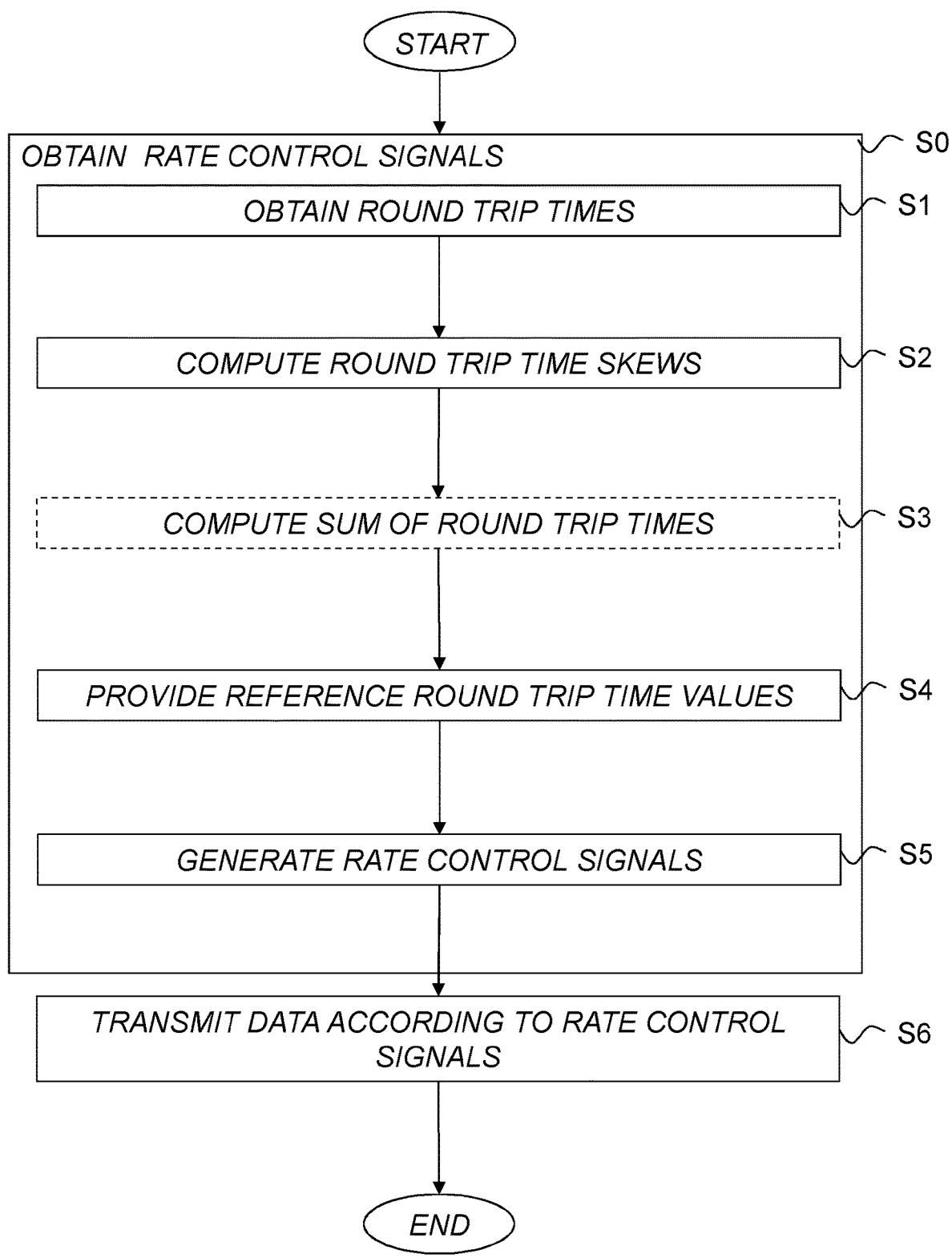
FIG. 8 is a flow diagram illustrating steps of an embodiment of a method for multipoint data flow control.

The result of the method illustrated in FIG. 4 is the generation of rate control signals for the individual wireless-transmission points. In the wireless communication system, the next step is therefore to utilize these rate control signals for controlling the actual transmission. FIG. 8 illustrates a flow diagram of steps of an embodiment of a method for multipoint data flow control in a wireless communication system. The wireless communication system has a number, n+1, where n≥1, of wireless-transmission points. The method comprises the step S0, where a rate control signal for each of the wireless-transmission points is obtained by a method according to FIG. 4. In step S6, data is transmitted to each of the wireless-transmission points according to a respective rate control signal.

In one embodiment, such steps may even be performed by the same node as performing the obtaining of the rate control signals.

Figure 9:
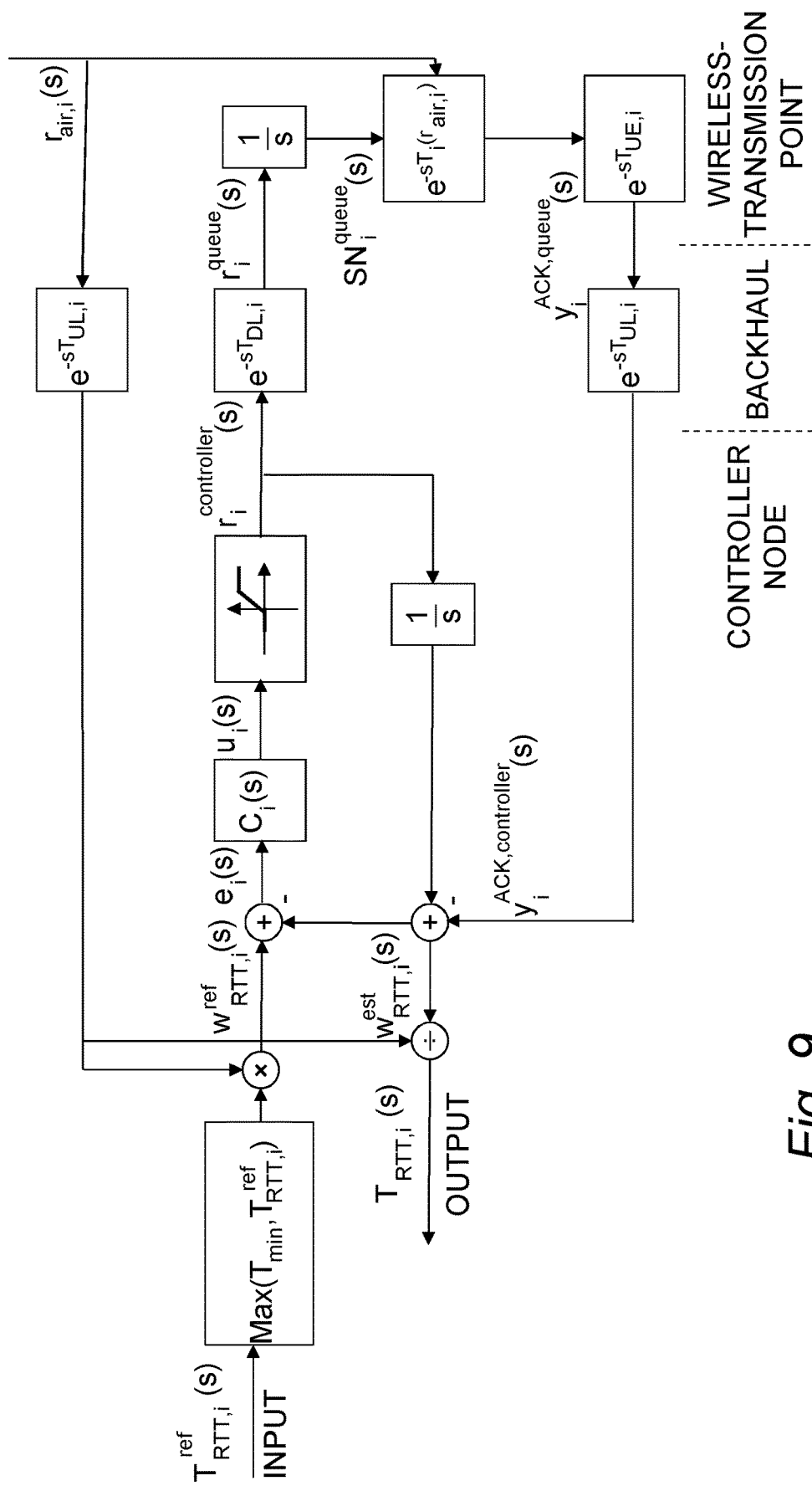
FIG. 9 is a block diagram of functionalities of an embodiment of an inner loop for multipoint data flow control.

The round trip time skew flow controller is preferably to a part performed in cooperation with the wireless-transmission points and the UEs. FIG. 9 is a block diagram of one embodiment of the inner loop controller.

The components can be explained as follows.

$w_{RTT,i}^{ref}(s)$ is the Laplace transform of the reference number of data items in flight over the backhaul interface, the transmit queue node, the wireless interface, the UE, and back, for transmit queue node i, i=1, . . . , n, and for the transmit queue node r.

$r_{air,i}(s)$ is the Laplace transform of the air interface rate, for the wireless interface i, i=1, . . . , n, and for the wireless interface r.

$e_i(s)$ is the Laplace transform of the control error, for the inner loop controller i, i=1, . . . , n, and for inner loop controller r.

$u_i(s)$ is the Laplace transform of the rate control signal, of the inner loop controller i, i=1, . . . , n, and for inner loop controller r.

$r_i^{controller}(s)$ is the Laplace transform of the securely positive rate control signal of the inner loop controller i, i=1, . . . , n, before leaving the controller node, and similarly for inner loop controller node r.

$r_i^{queue}(s)$ is the Laplace transform of the securely positive rate control signal of the inner loop controller i, i=1, . . . , n, when taking effect in the transmit queue node, i.e. in the wireless-transmission point, and similarly for inner loop controller r.

$SN_i^{queue}(s)$ is the Laplace transform of the sequence number representing the top data item of the top of queue of the transmit queue node i, i=1, . . . , n, and similarly for the transmit queue node r.

$y_i^{ACK,queue}(s)$ is the Laplace transform of the sequence number of the latest acknowledged data item, as received from the UE in the transmit queue node i, i=1, . . . , n, and similarly for the transmit queue node r.

$y_i^{ACK,controller}(s)$ is the Laplace transform of the sequence number of the latest acknowledged data item, from the transmit queue node i, i=1, . . . , n, as received in the controller node, and similarly for the transmit queue node r.

$w_{RTT,i}^{est}(s)$ is the Laplace transform of the estimated feedback information, i.e. the number of data items in flight, for transmit queue node i, i=1, . . . , n, and similarly for the transmit queue node r.

$T_{min}$ is a minimum value for the set point of the inner control loop.

Here $T_{RTT,i}^{ref}(s)$ is the signal defining the input interface of the inner loop from the outer round trip time skew control node, while $T_{RTR,i}(s)$ represents the output interface of the inner loop towards the outer round trip time skew control node.

The input from the outer round trip time skew control is first compared to the minimum value of the set point. The maximum value of the reference round trip time value for the inner feedback control loop and the minimum value of the set point is multiplied with the air interface rate, giving a reference number of data items. This reference number of data items is thus the target number of data items somewhere in the loop over the backhaul interface, the transmit queue node the wireless interface, the UE, and back, when taking the present air interface rate into account.

The reference number of data items in flight is compared with the estimated actual number of data items in flight, generating the control error, for the inner loop controller. This control error is in turn used for generating the rate control signal, by filtering the control error with the controller filter $C_i(s)$. The rate control signal is if necessary adjusted to assume a positive value, i.e. the rate control signal controlling the transmission of data is ensured to be a securely positive rate control signal. Data according to the securely positive rate control signal is transmitted to the wireless-transmission point over the downlink backhaul, and adds to the transmit node queue, i.e. the queue of the wireless-transmission point.

After delays caused by wireless transmission to the UE and back and the delay in the UE itself, an acknowledge signal is received in the wireless-transmission point. The sequence number of the latest acknowledged data item is transmitted back to the controller node as feedback information over the uplink backhaul.

The controller node keeps track on the last sequence number of data sent to the wireless-transmission point, by monitoring the securely positive rate control signal of the inner loop controller. An estimated number of data items in flight can thereby be obtained, which is used for the calculation of the control error, as described earlier. By dividing this estimated number of data items in flight by the air interface rate, an estimated round trip time can be achieved, which constitutes the output from the inner loop.

It is noted that another embodiment is achieved if the controller node stores the transmission time of each transmitted data item. The round trip time of each packet is then readily available in the controller node when the respective acknowledgment and sequence number of the data item are received back in the controller node.

Figure 10:
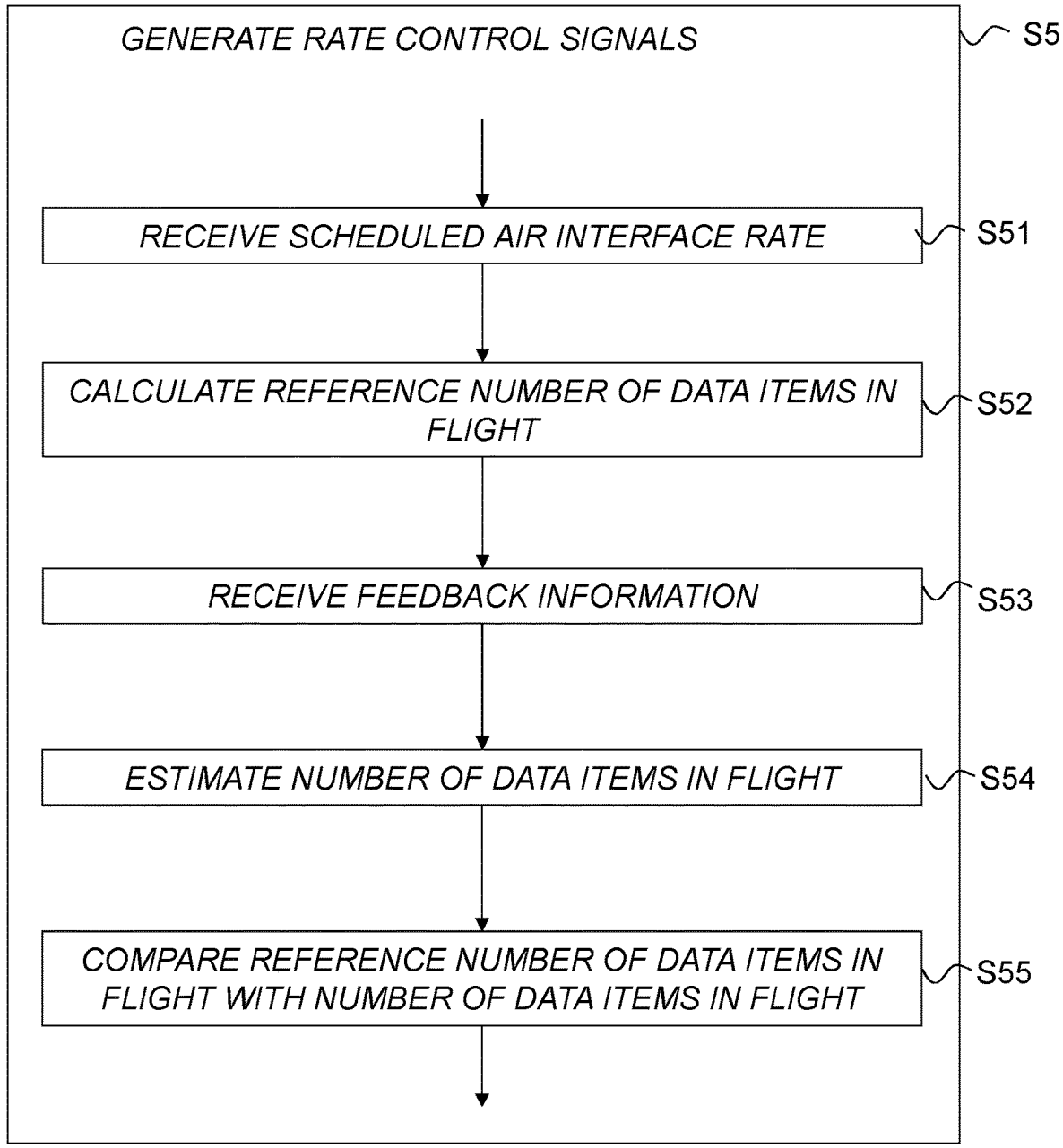
FIG. 10 is a part flow diagram illustrating part steps of an embodiment of a rate control signal generating step.

In other words, in one embodiment, as illustrated by the flow diagram of FIG. 10, the step of generating S5, for each of the wireless-transmission points, a rate control signal in turn comprises receiving S51 of data representing an air interface rate for a wireless interface of a respective wireless-transmission point. A reference number of data items in flight is calculated S52 by multiplying the reference round trip time value with the air interface rate. Feedback information is received S53 from a respective wireless-transmission point. A number of data items in flight is estimated S54 in dependence on the feedback information. The reference number of data items in flight is compared S55 with the estimated number of data items in flight. Thereby the rate control signal can be generated in dependence on the comparison.

Figure 11:
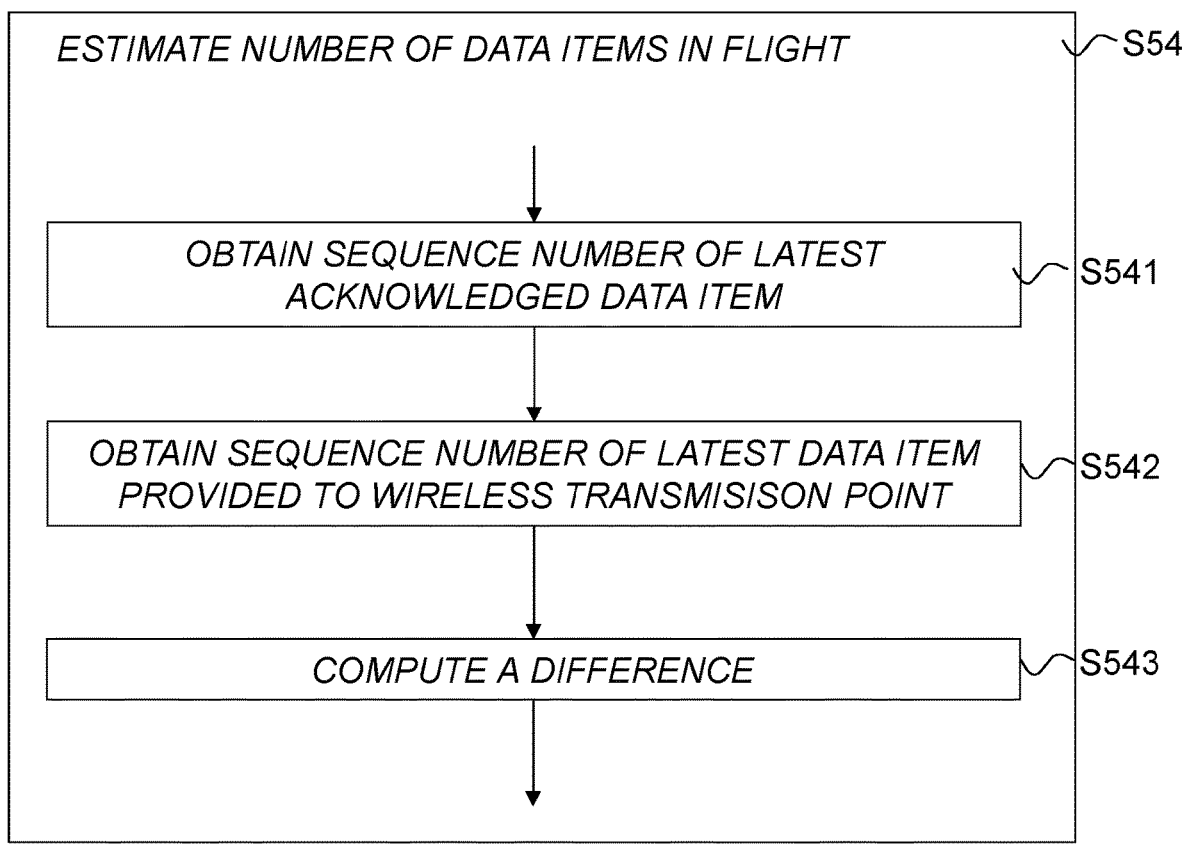
FIG. 11 is a part flow diagram illustrating part steps of an embodiment of a number of data items in flight estimating step.

In a particular embodiment, as illustrated in FIG. 11, the estimating S54 of a number of data items in flight comprises obtaining S541 of a sequence number of a latest acknowledged data item from the feedback information. A sequence number representing the latest data item provided to the respective wireless-transmission point is obtained S542. A difference between the sequence number representing the latest data item provided to the respective wireless-transmission point and the sequence number of a latest acknowledged data item from the feedback information is computed S543 as the number of data items in flight.

In a certain embodiment the inner loop controllers may be represented by pure delays, i.e. by $e^{-sT_i^{innerloop}}$, i=1, . . . , n, and similarly for inner loop controller r. The linear round trip time skew controller transfer functions may also be replaced by more advanced nonlinear ones.

Note that all parts of the invention depicted in FIGS. 5 and 7 resides in the controller node, while the inner loop window based controller operates over the controller node, the backhaul interface, the wireless-transmission point, the wireless interface, and the UE. Some of the principles of the inner loop controller, i.e. window based packets in flight control, is as such well known in prior art. Here, the description of these part merely serves as one example of an enabling embodiment. The use of window based inner loops to solve a round trip time skew control problem is not previously known. Moreover, the embedding operations represented by the multiplication and division in the very left of FIG. 9 are not previously shown and are parts of a preferred embodiment of an inner loop controller.

From a wireless-transmission point's view, the main controlling activities are handled by the controller node. However, the wireless-transmission point still plays an important active role in executing the actual transmissions and in providing the controller node with suitable data upon which the multipoint data flow control is based.

Figure 12:
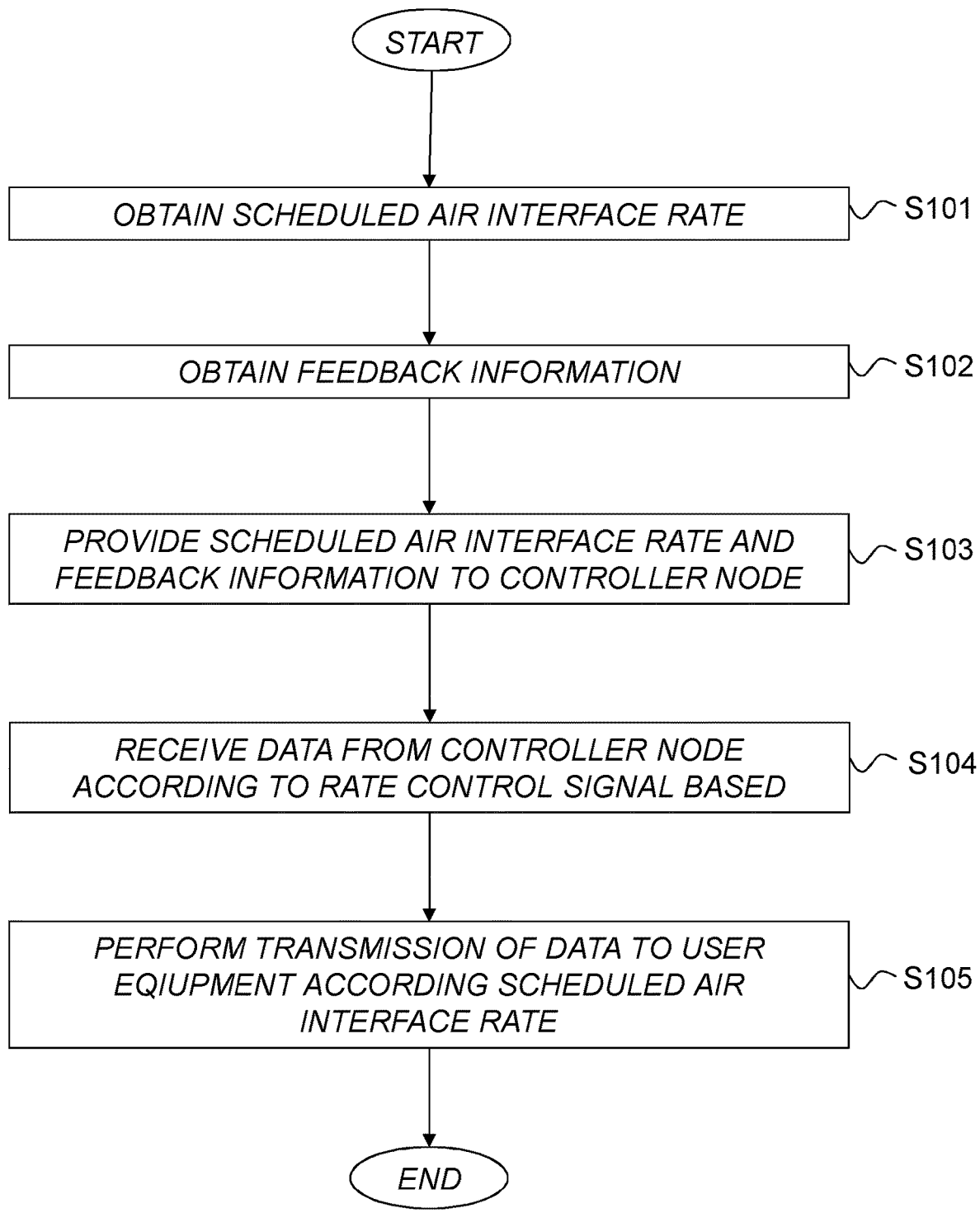
FIG. 12 is a flow diagram illustrating steps of an embodiment of a method for assisting in multipoint data flow control.

In FIG. 12, a flow diagram of steps of an embodiment of a method for assisting in multipoint data flow control in a wireless communication system is illustrated. This method is intended to be performed in a wireless-transmission point. In step S101, an air interface rate for a wireless interface between the wireless-transmission point and a user equipment is obtained. The air interface rate can typically be selected as a scheduled air interface rate. It is e.g. also possible to measure the effective air interface rate after re-transmission losses and use this effective air interface rate as the air interface rate. Also other types of estimations, predictions or controls of the air interface rate can be used for this purpose. In step 102, feedback information associated with sequence numbers of acknowledged data items is obtained. Data representing the air interface rate and the feedback information is provided, in step 103, to a controller node. In step 104, data is received from the controller node according to a rate control signal deduced from the air interface rate and the feedback information. In step 105, transmissions of the received data to the user equipment is performed according to the air interface rate.

In round trip time latency critical applications, such as C-MTC applications, the highest acceptable delay has to be less than the order of a fastest typical time constant of the process. Expressed otherwise, the controlled C-MTC process has a certain control bandwidth. A regular sampling of each control target has to be performed and control measures have to be decided. Such a sampling has typically to be at least 10-20 times faster than the control time constant, preferably as much as 100 times faster. The delay acceptable for the process has to be considerably smaller than the inverse of the process controlling bandwidth.

The multipoint data flow control has preferably to be configured in accordance with such demands. Therefore, in one embodiment, the steps of obtaining, computing, providing reference round trip time values, generating, and providing rate control signals are performed regularly with a constant sampling period.

To give a first overview of the technology presented herein, it is noted that the n+1 transmit queue nodes are nodes that perform the wireless interface transmission and that get their transmit data from transmit queues, typically 1 queue for each "bearer". A bearer may be thought of as an IP connection between the source and the end user. The reason why the transmit queue nodes need queues is that the radio channel is subject to rapid fading. Furthermore, the interface between the transmit queue nodes and the controller node, provided by the backhaul interface, is subject to delay in both the downlink and the uplink. To ensure that the transmit queue nodes do not run out of data when there is data to transmit upstream, queues are needed for buffering purposes. The queues are typically designed to give a packet dwell time of the order of the sum of the uplink (UL) and downlink (DL) backhaul delay.

Each queue in a transmit queue node is controlled by a so called inner loop controller, with the purpose of controlling the round trip time of the data to follow a desired reference value. In FIG. 9, the reference values for the inner loop controllers are $T_{RTT,i}^{ref}(s)$, i=1, . . . , n, while the controlled outputs are $T_{i,RTT}(s)$ i=1, . . . , n, with similar values being in place for inner loop controller r. The resulting inner loop dynamics are represented by the transfer functions $G_{window,i}^{inner}(s)$, i=1, . . . , n, and similarly for the inner loop dynamics r. They represent the aggregated effect of all features of the inner loop, including any nonlinear effects.

One prominent feature of the technology presented herein that cannot be found in prior art is that the round trip time skew is used for control purposes. In particular embodiments, the round trip time skew is defined as the differences between the total round trip delay between the slave nodes (n in FIGS. 5 and 7) measured against the total round trip delay of the reference node r, for each instance of the round trip time skew controller of FIGS. 5 and 7. These quantities are given by the equations:

$$T_{RTT,skew,i}(s)=T_{RTT,i}(s)-T_{RTT,r}(s), i=1, \ldots, n, \quad (5)$$

where r denotes the selected reference path to node r. The round trip times can be easily measured, e.g., by time tagging of a typical transmitted data item per sampling instance, and by measurement of the time when an acknowledgement (ACK) is received back. An important restriction is then that the ACK needs to travel on the same leg as the data it represents.

The relation for the sum of round trip times becomes:

$$T_{RTT,sum}(s)=T_{RTT,i}(s)+ \ldots +T_{RTT,n}(s)+T_{RTT,r}(s). \quad (6)$$

The measurement of time skew and sum of delay therefore involves controlling and measuring of the round trip delay, in each inner loop controller, as well as forming the round trip time skew and sum of round trip time for each bearer, in the controller node.

Another prominent feature of certain embodiments of the technology presented herein that cannot be found in prior art is an enhanced transformation of the round trip time skew control command, to the round trip time reference signals needed by the inner loop controllers discussed above. The enhanced transformation comprises a separate controller for the sum of the round trip time channel. The controller is represented by the transfer function $C_{RTT,sum}(s)$. The use of a controller for this signal, allows accurate regulation of the signal towards the selected reference value. The so produced control signal is combined with the round trip time skew control signal by the combining matrix network M, to produce the sought reference values $T_{RTT,i}^{ref}(s)$, i=1, . . . , n.

Another prominent feature of certain embodiments of the technology presented herein that cannot be found in prior art includes the possibility to set the reference value for the sum of the round trip time delays, as counted over all paths/links. This is very useful to ensure that paths/links are not dropped because of data starvation. Such a data starvation over a link means that ultra—lean piggy backed control channel and system information data would not be signaled. This could then result in loss of critical link information like wireless channel state information or synchronization that could lead to said path/link being dropped. One way to avoid this is to ensure that there is always some data going over all paths/links that are desired to be active. This is achieved by the invention via the setpoint value or reference value $T_{RTT,sum}^{ref}(s)$ and the associated controller filter $C_{RTT,sum}(s)$. This can e.g. be understood by considering the case with zero skew reference value. In that case the sum of delay will become distributed along all paths/links so if the reference value is high enough the round trip delay of all links will be significantly larger than the backhaul delays of said links. That means that the transmit data queues will have to add a delay, something that requires a non-zero data volume in all transmit queues. Note that in 5G it will be increasingly important to keep multiple links active since very sudden drops of main links may occur to the very sharp radio shadowing that occur at high carrier frequencies. See e.g. "Multi-rate uplink channel prediction and enhanced link adaptation for VoLTE" by D. Sandberg and T. Wigren, Proc. VTC 2015 Fall, Boston, Ma, Sep. 6-9, 2015.

The sum of round trip delay control channel is thus associated with this topic. In one embodiment, interval control is introduced, by means of the deadzone following the summation point of this control channel. This is e.g. the case in FIG. 5. The reason why this is an advantage can be explained as follows. The C-MTC applications that are the driver for the invention are most often based on regular sampling of control signals and feedback information. The consequence is that the round trip time skews between each of the data paths of FIG. 5 typically need to be controlled towards a zero reference value. If this is not the case, control signals of C-MTC applications sent over different transmit nodes (paths) may arrive early or late as compared to other signals. With this constraint it follows that in case the backhaul delay of one of the paths would change, the delays of all other paths must also change, by means of adjustments of the data volume of all other transmit node queues. This may sometimes require a change of the measured sum of round trip times that is controlled by the sum of round trip time channel. Unless the reference value of this channel is also changed, the result may be an inconsistency with the skew control objective, with negative queue dwell times. To avoid this, consistency may be ensured by a deadzone in the sum of the round trip time channel. The width of this dead-zone needs to be at least equal to the worst case round trip time of a path, multiplied with the number of paths.

As an example, consider the following 2 path case.
Path 1:
Backhaul UL delay=1 ms.
Backhaul DL delay=1 ms.
Path 2 (reference):
Backhaul UL delay=2 ms.
Backhaul DL delay=2 ms.
T_sum_ref=12 ms
T_skew_ref=0 ms.
In this case the controller would settle for (without deadzone)
T_queue_1=4 ms.
T_queue_2=2 ms.
In case the DL backhaul delay of leg 2 would change to 5 ms, the solution would change to
T_queue_1=4 ms.
T_queue_2=−1 ms.
This is clearly infeasible. A deadzone which allows a few milliseconds margin would allow settling to a feasible solution.

Note that since the control objective for the round trip time skew for C-MTC is most often zero, the deadzones of these control channels are marked as optional in FIG. 5. At this point it is also noted that the use of deadzones in the skew control loops of the previous applications allow room for such an adjustment there, thereby keeping consistency with the sum of downlink delay loop.

In the embodiment of FIG. 7, the deadzone issue is alternatively handled by introducing interval control at the output from the combining matrix instead, directly on the reference round trip times.

Guaranteed inner loop stability is of importance in practice since global stability provides a guarantee against occasional malfunction of the controller algorithm, something that could affect performance negatively. To address stability of the inner loop feedback loop of FIG. 5 or 7 a number of actions are necessary. The block diagram of FIG. 9 needs to be transformed to the block diagram of FIG. 3, for which the Popov criterion is valid.

The loop gain $\hat{g}_i(s)$ of the resulting transformed block diagram has to be computed.

The Popov criterion has to be applied. Now, an inspection of the block diagram of FIG. 9 indicates that the loop gain can be computed without a block transformation, simply by computation of the transfer function from the signal between $r_i^{controller}(s)$ and $u_i(s)$. Straightforward computations result in:

$$\hat{g}_i(s) = \frac{C_i(s)}{s}\left(1 - e^{-s(T_{DL,i}+T_i+T_{UE,i}+T_{UL,i})}\right) = \frac{C_i(s)}{s}(1 - e^{-sT_{RTT,i}}) \quad (7)$$

The stability condition expressed by the Popov condition now becomes:

$$\text{Re}[(1+jq\omega)\hat{g}_i(s)] > -1, \text{ for all } \omega \geq 0, \text{ some } q \geq 0. \quad (8)$$

This follows since the maximum slope of the nonlinearity is 1.

A straightforward computation for a constant controller filter shows that:

$$\text{Im}[\hat{g}_i(j\omega)] = \frac{C(\cos(\omega T_{RTT,i}) - 1)}{\omega} \leq 0. \quad (9)$$

Figure 13:
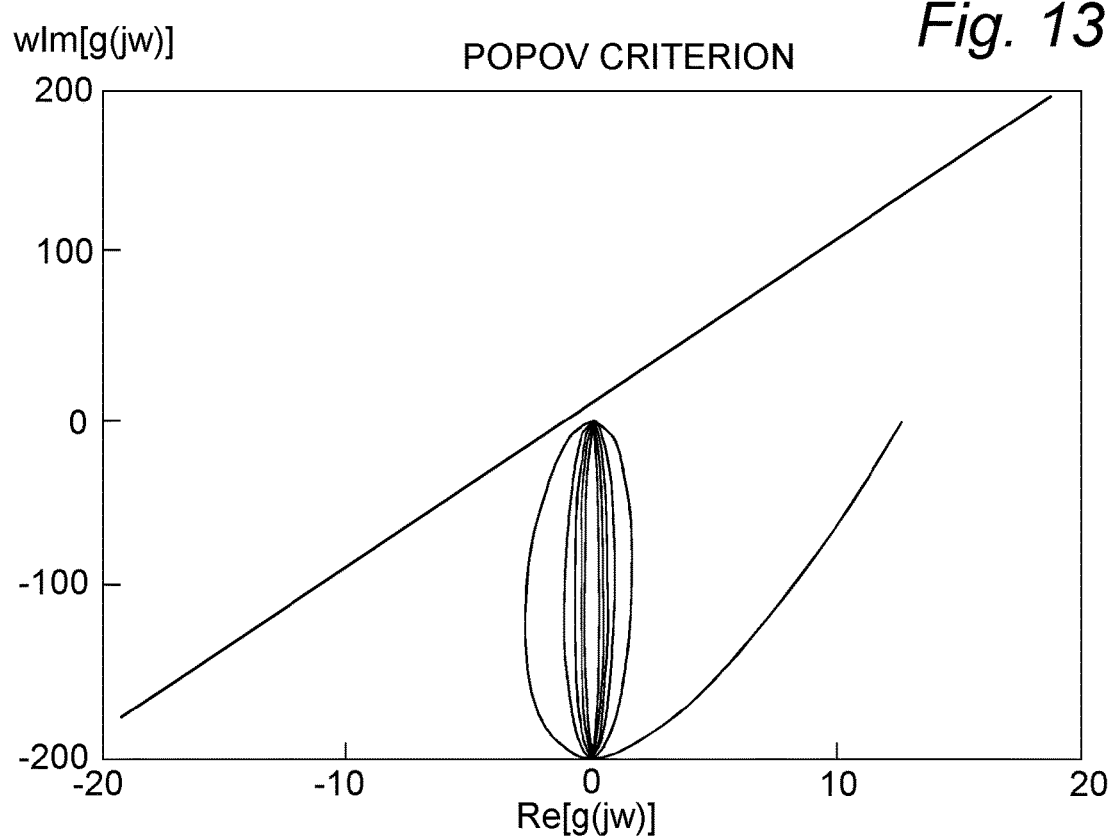
FIG. 13 illustrates an example Popov plot relating to inner loop global stability.

This means that the Popov curve is always confined to the lower complex half plane. It is therefore always possible to find a line through the pivot point −1+j0 with positive slope so that the Popov curve is to the right (and below) the line. The conclusion is that the inner loops of the invention are globally stable irrespective of the round trip time they may encounter. An illustration appears in FIG. 13.

In order to achieve the time invariant embedding discussed above, certain signaling has to be performed between the wireless-transmission point and the controller node. The wireless rate experienced by the wireless-transmission point has to be provided to the controller node, associated with an identity of the node in question. This can e.g. be achieved by signaling a slave node identity (number) and a bearer identity (number).

The presently presented technology provides improved 5G multipoint flow control, by the use of round trip time skew flow control. Such a round trip time skew flow control allows for a guaranteed latency and latency differences when 5G multi-point transmission is used, e.g. for C-MTC. Furthermore, there is provided a flow control that is consistent with the 5G concept of ultra-lean transmission. The presently presented technology also have very good stability properties due to the focus on round trip time skew control, enabling the application of globally unconditionally stable window based inner loop single leg control.

As used herein, the non-limiting terms "User Equipment (UE)", "station (STA)" and "wireless communication device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs, or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a controller node configured to assist in multi-point data flow control in a wireless communication system. The wireless communication system has a number, n+1, where n≥1, of wireless-transmission points. The controller node is configured to obtain, for each of the wireless-transmission points, a round trip time of a present sampling period for data travelling to a user equipment via a respective wireless-transmission point and an acknowledge message travelling back via said respective wireless-transmission point. The controller node is configured to compute a round trip time skew for the present sampling period for individual wireless-transmission points. The round trip time skew is a difference between the obtained round trip time of a respective the wireless-transmission point and a reference value. The controller node is configured to provide a reference round trip time value for each of the wireless-transmission points in dependence of the computed round trip time skews. The controller node is configured to generate, for each of the wireless-transmission points, a rate control signal in dependence of a respective the reference round trip time value.

In one embodiment, the controller node is configured to obtain the reference value as the round trip time of a reference wireless-transmission point of the wireless-transmission points. Thereby, the round trip time skew becomes a difference between the obtained round trip time of a respective wireless-transmission point and the obtained round trip time of the reference wireless-transmission point. The controller node is further configured to compute the round trip time skews for each wireless-transmission point except the reference wireless-transmission point. In a further embodiment, the controller node is configured to perform the providing under a constraint of controlling each of said round trip time skews towards zero.

In one embodiment, the controller node is configured to further comprise computation of a sum of said round trip times of said wireless-transmission points for said present sampling period in the computing. The controller node is thereby configured to provide the reference round trip time value in further dependence of the computed sum of the round trip times. In a further embodiment, the controller node is configured to, in the providing, further comprise setting of a reference value for the computed sum of the round trip times, and providing the reference round trip time value under a constraint of controlling the sum of the round trip times towards the reference value. In a further embodiment, the controller node is configured to, in the providing, further comprise refraining from controlling of the sum of the round trip times if the sum of the round trip times lies within a predefined deadzone for the reference value for the computed sum of the round trip times.

In one embodiment, the controller node is configured, in the providing of a reference round trip time value for each of the wireless-transmission points to transfer the computed round trip time skews into filtered round trip time skew errors, to transfer the computed sum of the round trip times into a filtered sum of round trip times error, and to combine the filtered round trip time skew errors and the filtered sum of round trip times error into the reference round trip time values by a combining matrix. In a further embodiment, the combining matrix is a matrix statically decoupling the respective reference round trip time values.

In one embodiment, the controller node is configured, in the combining of the filtered round trip time skew errors and the filtered sum of round trip times error into the reference round trip time value, to set positive output values of the combining matrix as the reference round trip time values and to adjust negative output values of the combining matrix into zero reference round trip time values.

In one embodiment, the controller node is configured, in the generating, for each of the wireless-transmission points, of a rate control signal, to receive data representing an air interface rate for a wireless interface of a respective wireless-transmission point. The controller node is further configured to calculate a reference number of data items in flight by multiplying the reference round trip time value with the air interface rate. The controller node is further configured to receive feedback information from a respective wireless-transmission point, to estimate a number of data items in flight in dependence on the feedback information, and to compare the reference number of data items in flight with the estimated number of data items in flight. The rate control signal is thereby generated in dependence on the comparison.

In one embodiment, the controller node is configured to perform the estimating of a number of data items in flight by obtaining a sequence number of a latest acknowledged data item from the feedback information, by obtaining a sequence number representing the latest data item provided to the respective wireless-transmission point, and by computing a difference between the sequence number representing the latest data item provided to the respective wireless-transmission point and the sequence number of a latest acknowledged data item from the feedback information as the number of data items in flight.

In one embodiment, the controller node is configured to perform the obtaining, computing, providing of reference round trip time values, generating, and providing of rate control signals regularly with a constant sampling period.

In one embodiment, the controller node is further configured to transmit data to each of the wireless-transmission points according to respective the rate control signal.

Figure 14:
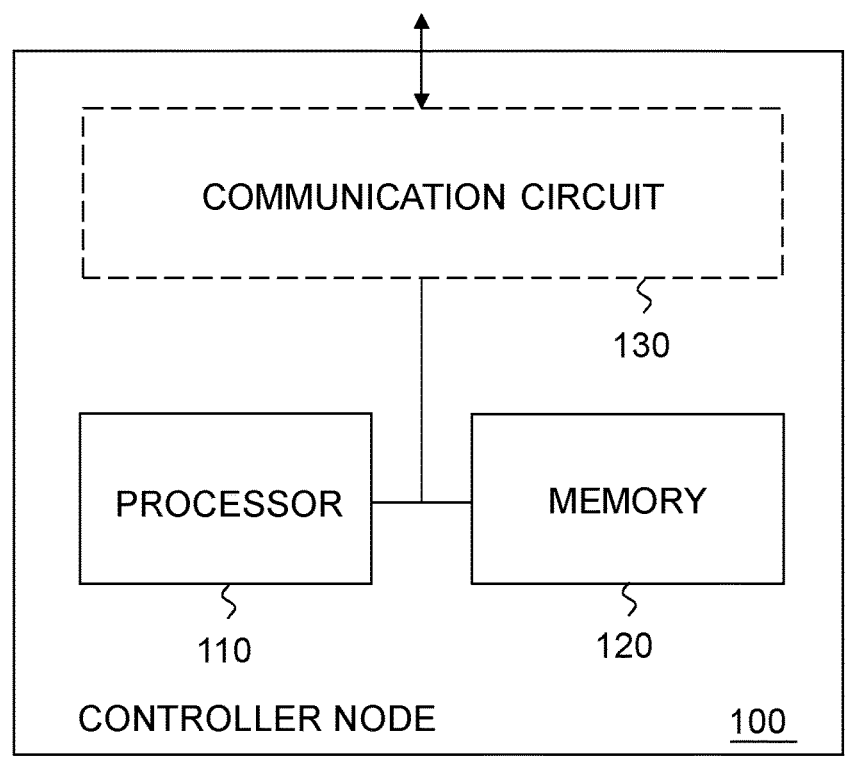
FIG. 14 is a schematic block diagram of an embodiment of a controller node.

FIG. 14 is a schematic block diagram illustrating an example of a controller node 100, based on a processor-memory implementation according to an embodiment. In this particular example, the controller node 100 comprises a processor 110 and a memory 120, the memory 120 comprising instructions executable by the processor 110, whereby the processor is operative to assist in multipoint data flow control in a wireless communication system. The processor is operative to compute the round trip time skews, to provide the reference round trip time values and to generate the rate control signals.

The controller node 100 may also include a communication circuit 130. The communication circuit 130 may include functions for wired and/or wireless communication with other devices and/or network nodes in the network. In a particular example, the communication circuit 130 may be based on radio circuitry for communication with one or more other nodes, including transmitting and/or receiving information. The communication circuit 130 may be interconnected to the processor 110 and/or memory 120. By way of example, the communication circuit 130 may include any of the following: a receiver, a transmitter, a transceiver, input/output (I/O) circuitry, input port(s) and/or output port(s). In one embodiment, the controller node comprises communication circuitry configured to obtain the round trip times.

Figure 15:
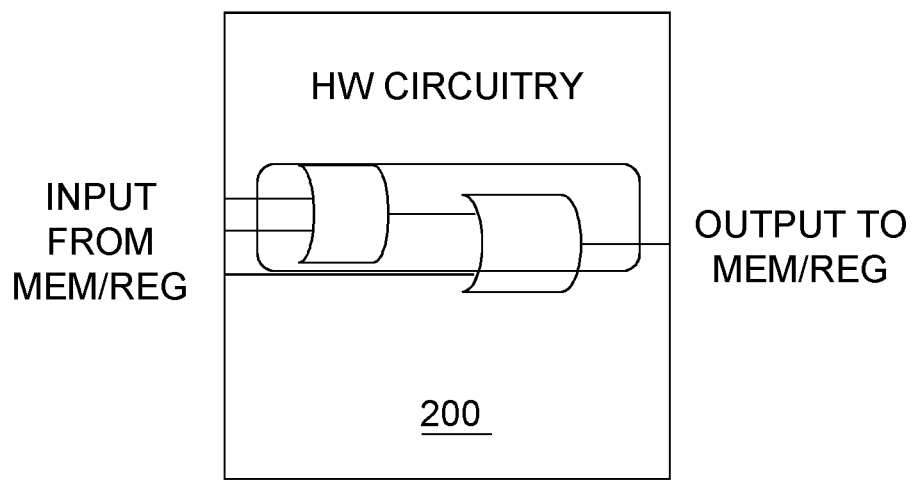
FIG. 15 is a schematic block diagram of another embodiment of a controller node.

FIG. 15 is a schematic block diagram illustrating another example of a controller node 200, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 16:
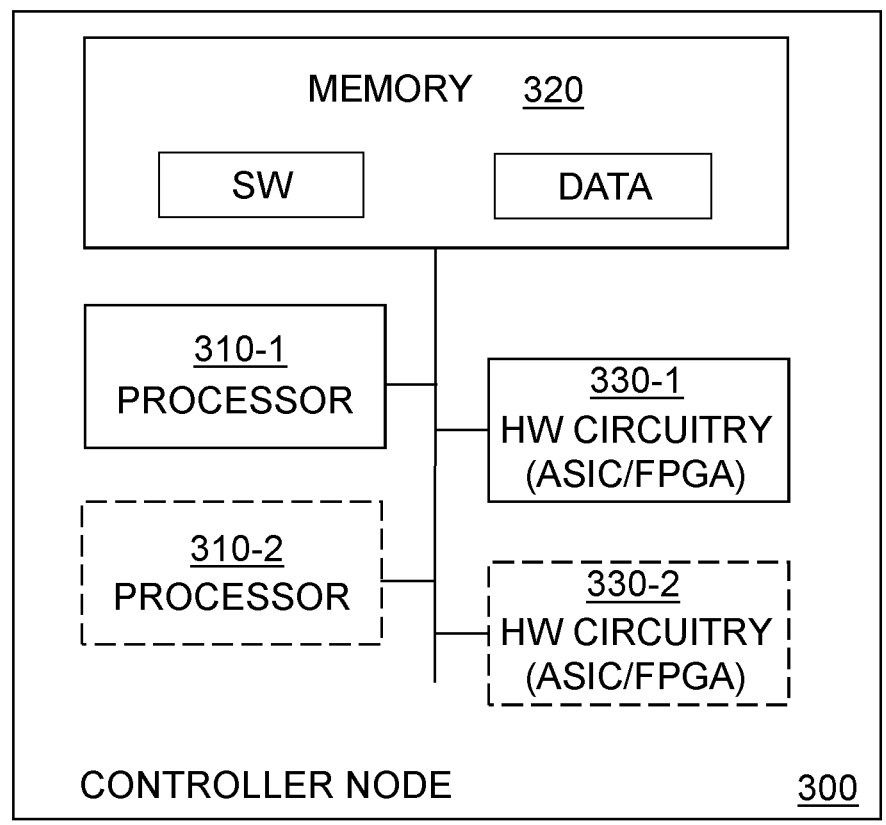
FIG. 16 is a schematic block diagram of yet another embodiment of a controller node.

FIG. 16 is a schematic block diagram illustrating yet another example of a controller node 300, based on combination of both processor(s) 310-1, 310-2 and hardware circuitry 330-1, 330-2 in connection with suitable memory unit(s) 320. The controller node 300 comprises one or more processors 310-1, 310-2, memory 320 including storage for software and data, and one or more units of hardware circuitry 330-1, 330-2 such as ASICs and/or FPGAs. The overall functionality is thus partitioned between programmed software (SW) for execution on one or more processors 310-1, 310-2, and one or more pre-configured or possibly reconfigurable hardware circuits 330-1, 330-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 17:
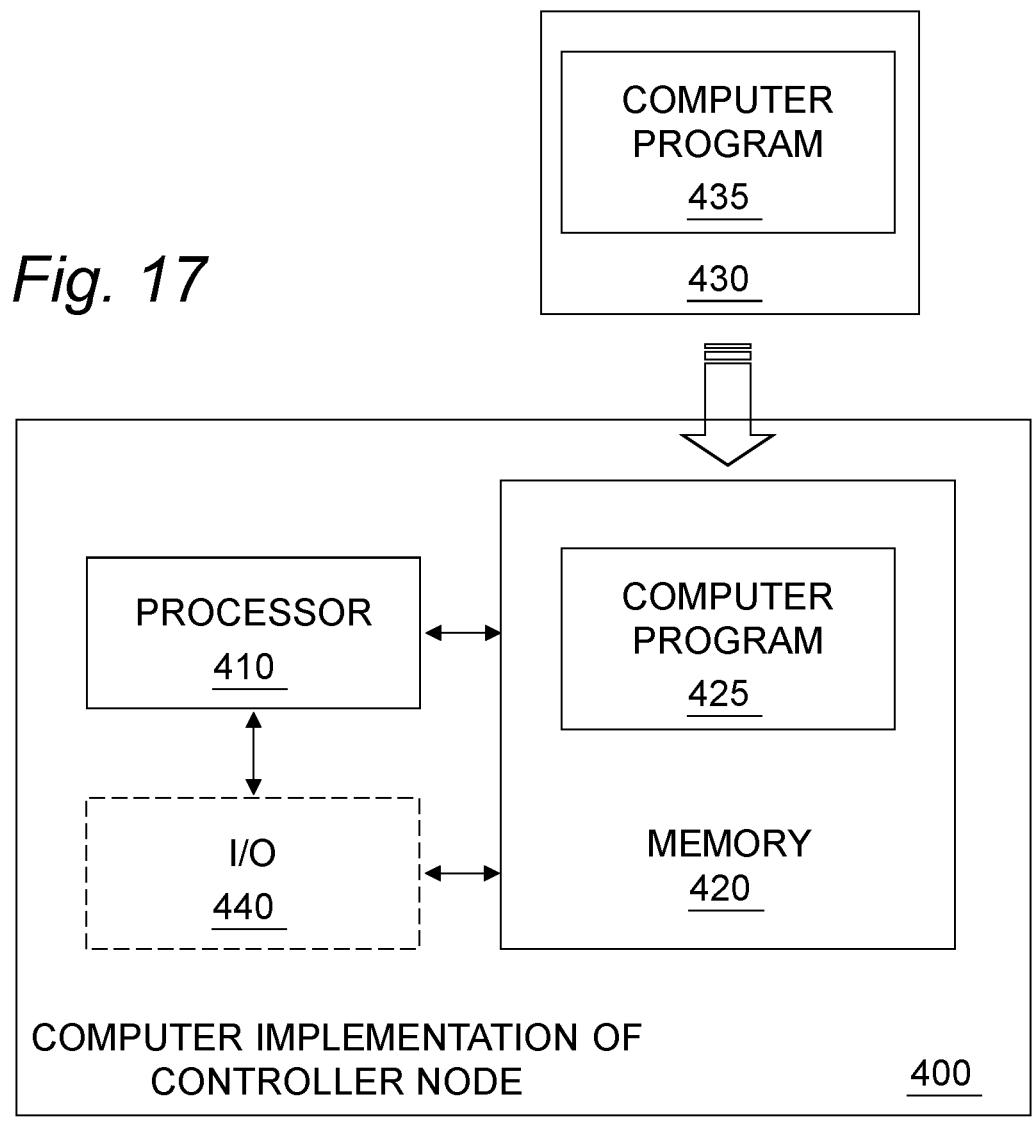
FIG. 17 is a schematic diagram illustrating an embodiment of a computer-implementation of a controller node.

FIG. 17 is a schematic diagram illustrating an example of a computer-implementation 400 according to an embodiment of a controller node. In this particular example, at least some of the steps, functions, procedures, modules and/or blocks described herein are implemented in a computer program 425; 435, which is loaded into the memory 420 for execution by processing circuitry including one or more processors 410. The processor(s) 410 and memory 420 are interconnected to each other to enable normal software execution. An optional input/output device 440 may also be interconnected to the processor(s) 410 and the memory 420 to enable input and output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 410 is thus configured to perform, when executing the computer program 425, well-defined processing tasks such as those described herein.

The processing circuitry does not have to be dedicated to only execute the above-described steps, functions, procedure and/or blocks, but may also execute other tasks.

In a particular embodiment, the computer program 425; 435 comprises instructions, which when executed by at least one processor 410, cause the processor(s) 410 to obtain, for each of a number, n+1, where n≥1, of wireless-transmission points in a wireless communication system, a round trip time of a present sampling period for data travelling to a user equipment via a respective wireless-transmission point and an acknowledge message travelling back via the respective wireless-transmission point, to compute a round trip time skew for the present sampling period for individual wireless-transmission points. The round trip time skew is a difference between the obtained round trip time of a respective wireless-transmission point and a reference value. The computer program 425; 435 comprises further instructions, which when executed by the processor(s) 410, cause the processor(s) 410 to provide a reference round trip time value for each of the wireless-transmission points in dependence of the computed round trip time skews, and to generate, for each of the wireless-transmission points, a rate control signal in dependence of a respective reference round trip time value.

According to another aspect of the proposed technology there is provided a wireless-transmission point in a wireless communication system configured to obtain an air interface rate for a wireless interface between the wireless-transmission point and a user equipment. The wireless-transmission point is further configured to obtain feedback information associated with sequence numbers of acknowledged data items. The wireless-transmission point is configured to provide data representing the air interface rate and the feedback information to a controller node. The wireless-transmission point is configured to receive data from the controller node according to a rate control signal deduced from the air interface rate and the feedback information. The wireless-transmission point is configured to perform transmissions of the received data to the user equipment according to the air interface rate.

Figure 18:
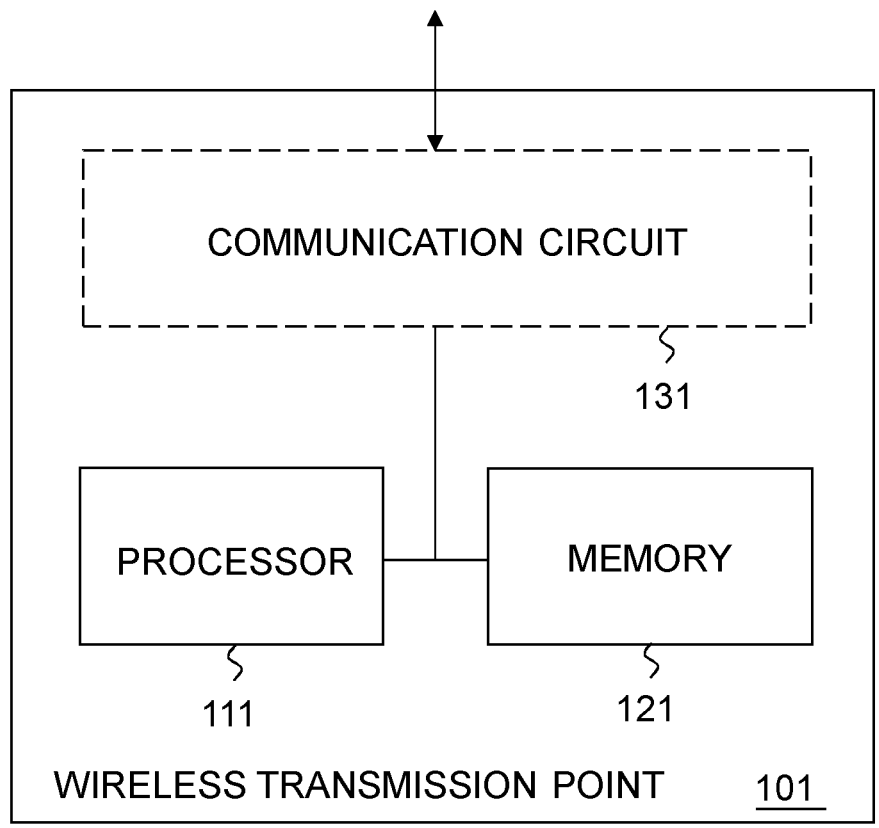
FIG. 18 is a schematic block diagram of an embodiment of a wireless-transmission point.

FIG. 18 is a schematic block diagram illustrating an example of a wireless transmission point 101, based on a processor-memory implementation according to an embodiment. In this particular example, wireless transmission point 101 comprises a processor 111 and a memory 121, the memory 121 comprising instructions executable by the processor 111, whereby the processor is operative to obtain the air interface rate and to obtain the feedback information.

The wireless transmission point 101 may also include a communication circuit 131. The communication circuit 131 may include functions for wired and/or wireless communication with other devices and/or network nodes in the network. In a particular example, the communication circuit 131 may be based on radio circuitry for communication with one or more other nodes, including transmitting and/or receiving information. The communication circuit 131 may be interconnected to the processor 111 and/or memory 121. By way of example, the communication circuit 131 may include any of the following: a receiver, a transmitter, a transceiver, input/output (I/O) circuitry, input port(s) and/or output port(s). In one embodiment, the transmission point comprises communication circuitry 131 configured to provide the data representing the air interface rate and the feedback information to the controller node, to receive the data from the controller node, and to perform transmissions to the user equipment according to the air interface rate.

Figure 19:
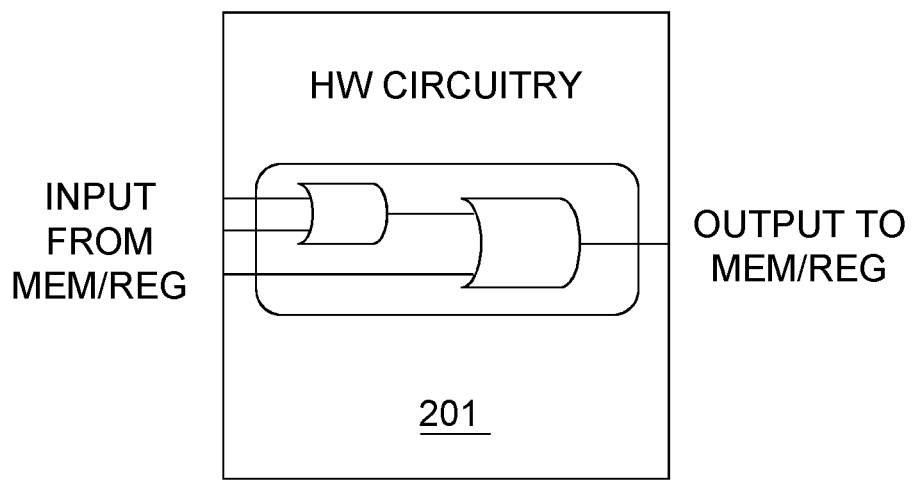
FIG. 19 is a schematic block diagram of another embodiment of a wireless-transmission point.

FIG. 19 is a schematic block diagram illustrating another example of a wireless transmission point 201, based on a hardware circuitry implementation according to an embodiment. Particular examples of suitable hardware (HW) circuitry include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 20:
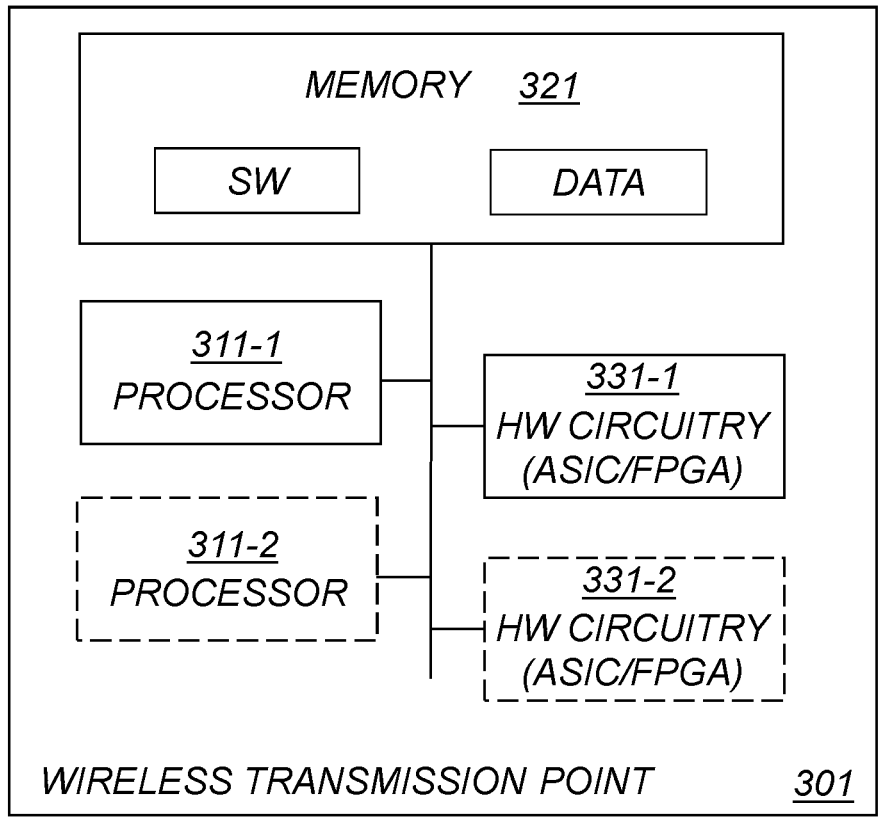
FIG. 20 is a schematic block diagram of yet another embodiment of a wireless-transmission point.

FIG. 20 is a schematic block diagram illustrating yet another example of a wireless transmission point 301, based on combination of both processor(s) 311-1, 311-2 and hardware circuitry 331-1, 331-2 in connection with suitable memory unit(s) 321. The wireless transmission point 301 comprises one or more processors 311-1, 311-2, memory 321 including storage for software and data, and one or more units of hardware circuitry 331-1, 331-2 such as ASICs and/or FPGAs. The overall functionality is thus partitioned between programmed software (SW) for execution on one or more processors 311-1, 311-2, and one or more pre-configured or possibly reconfigurable hardware circuits 331-1, 331-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units, in analogy with the controller node.

Figure 21:
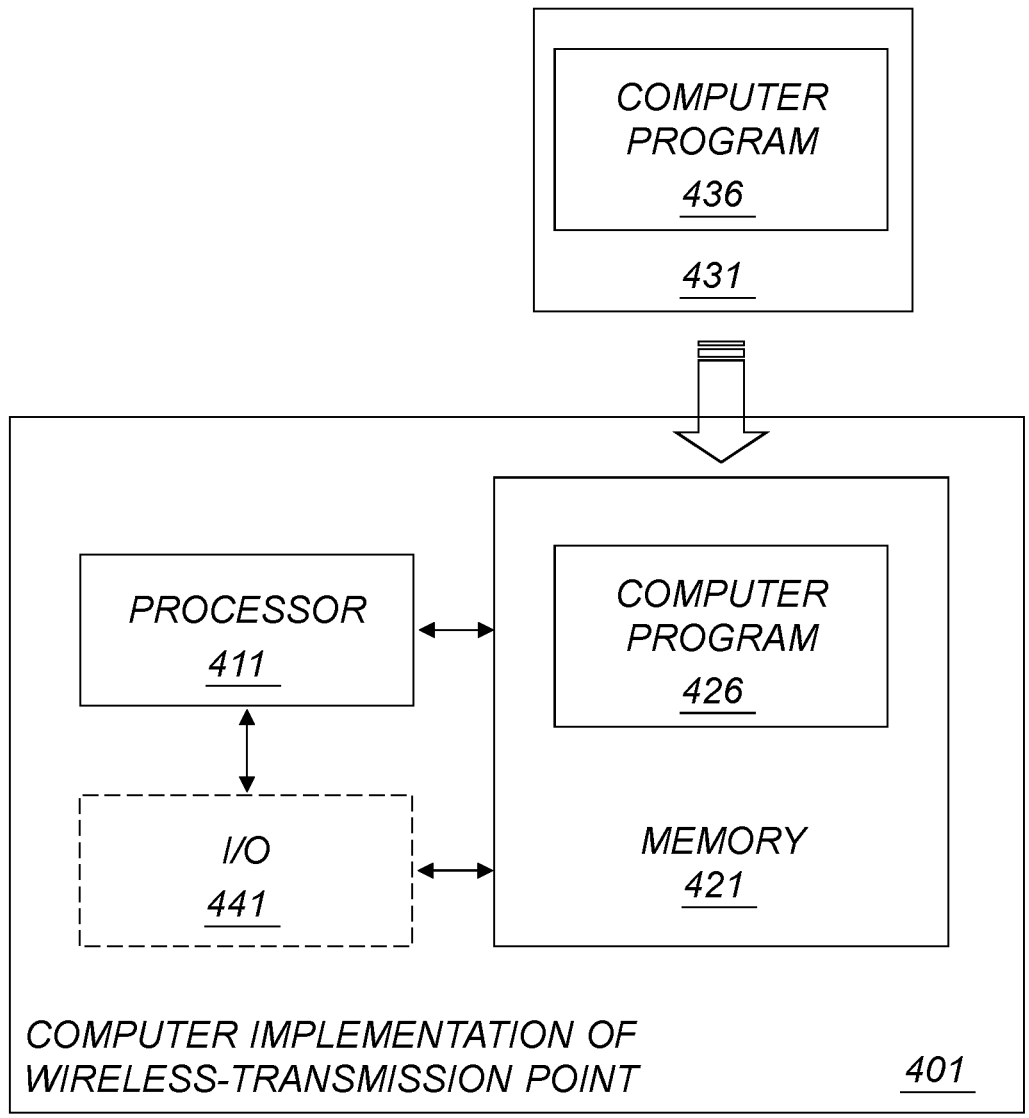
FIG. 21 is a schematic diagram illustrating an embodiment of a computer-implementation of a wireless-transmission point.

FIG. 21 is a schematic diagram illustrating an example of a computer-implementation 401 according to an embodiment of a wireless-transmission point. In this particular example, at least some of the steps, functions, procedures, modules and/or blocks described herein are implemented in a computer program 426; 436, which is loaded into the memory 421 for execution by processing circuitry including one or more processors 411. The processor(s) 411 and memory 421 are interconnected to each other to enable normal software execution. An optional input/output device 441 may also be interconnected to the processor(s) 411 and/or the memory 421 to enable input and/or output of relevant data such as input parameter(s) and/or resulting output parameter(s).

In a particular embodiment, the computer program comprises instructions, which when executed by at least one processor, cause the processor(s) to obtain an air interface rate for a wireless interface between a wireless-transmission point and a user equipment, to obtain feedback information associated with sequence numbers of acknowledged data items, and to provide data representing the air interface rate and the feedback information to a controller node. The computer program comprises further instructions, which when executed by the processor(s), cause the processor(s) to receive data from the controller node according to a rate control signal deduced from the air interface rate and the feedback information, and to perform transmissions of the received data to the user equipment according to the air interface rate.

The proposed technology also provides a computer-program product comprising a computer-readable medium having stored thereon a computer program as described here above.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, referring to FIG. 17, the software or computer program 425; 435 may be realized as a computer program product, which is normally carried or stored on a computer-readable medium 420; 430, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Likewise, by way of example, referring to FIG. 21, the software or computer program 426; 436 may be realized as a computer program product, which is normally carried or stored on a computer-readable medium 421; 431, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 22:
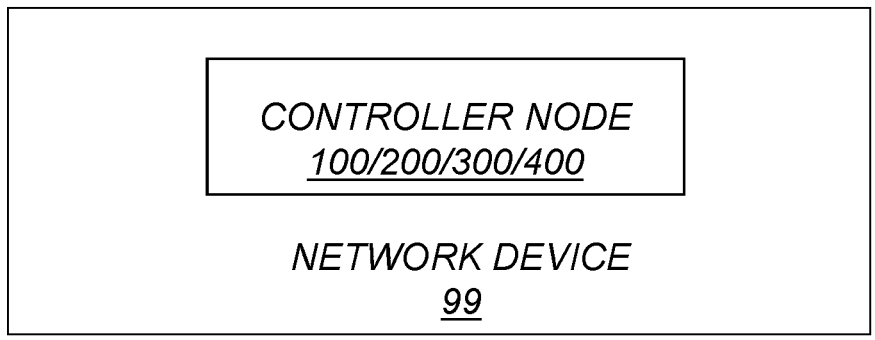
FIG. 22 is a schematic block diagram illustrating an embodiment of a network device.

FIG. 22 is a schematic block diagram illustrating an example of a network device 99 comprising a controller node 100; 200; 300; 400 according to any of the embodiments.

According to an aspect, there is provided a network device 99 comprising a controller node 100; 200; 300; 400 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

Figure 23:
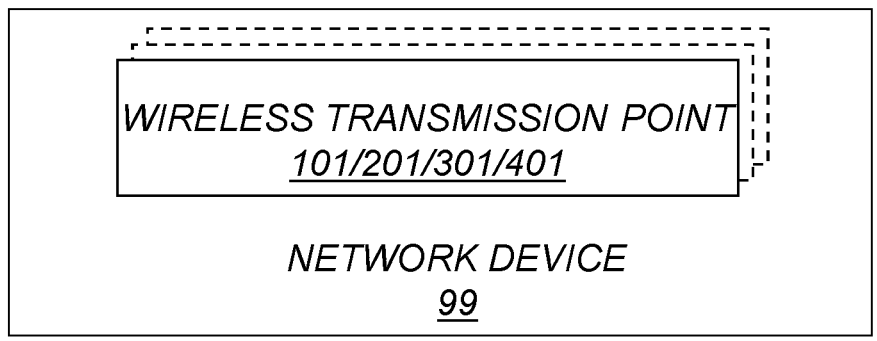
FIG. 23 is a schematic block diagram illustrating another embodiment of a network device.

FIG. 23 is a schematic block diagram illustrating an example of a network device 99 comprising a wireless-transmission point 101; 201; 301; 401 according to any of the embodiments.

According to an aspect, there is provided a network device 99 comprising a wireless-transmission point 101; 201; 301; 401 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 24:
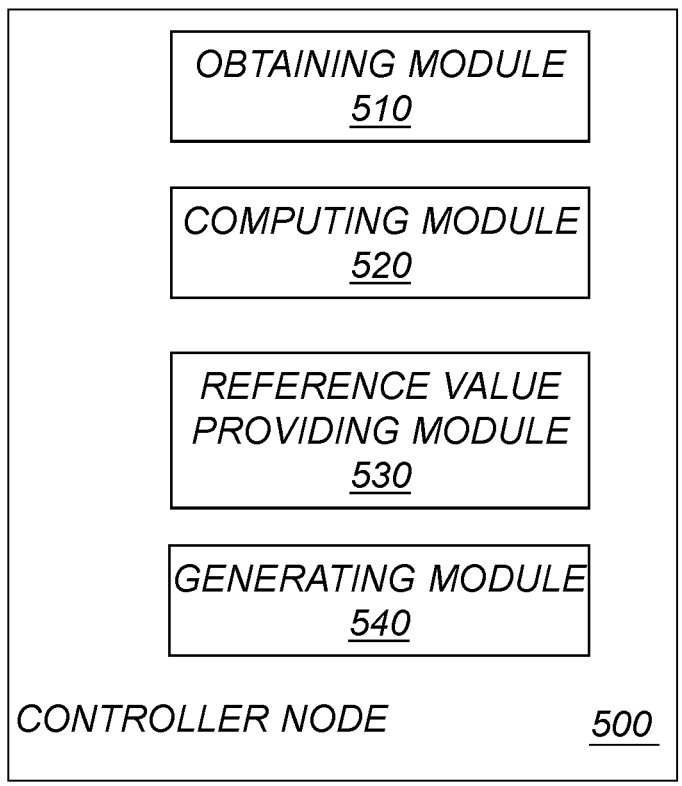
FIG. 24 is a schematic diagram illustrating an embodiment of a controller node.

FIG. 24 is a schematic diagram illustrating an example of a controller node 500 for assisting in multipoint data flow control in a wireless communication system. The wireless communication system has a number, n+1, where n≥1, of wireless-transmission points. The controller node comprises an obtaining module 510 for obtaining, for each of the wireless-transmission points, a round trip time of a present sampling period for data travelling to a user equipment via a respective wireless-transmission point and an acknowledge message travelling back via the respective wireless-transmission point. The controller node further comprises a computing module 520 for computing a round trip time skew for said present sampling period for individual said wireless-transmission points. The round trip time skew is a difference between the obtained round trip time of a respective the wireless-transmission point and a reference value. The controller node further comprises a reference value providing module 530 for providing a reference round trip time value for each of the wireless-transmission points in dependence of the computed round trip time skews. The controller node further comprises a generating module 540 for generating, for each of the wireless-transmission points, a rate control signal in dependence of a respective reference round trip time value.

Alternatively it is possible to realize the module(s) in FIG. 24 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Figure 25:
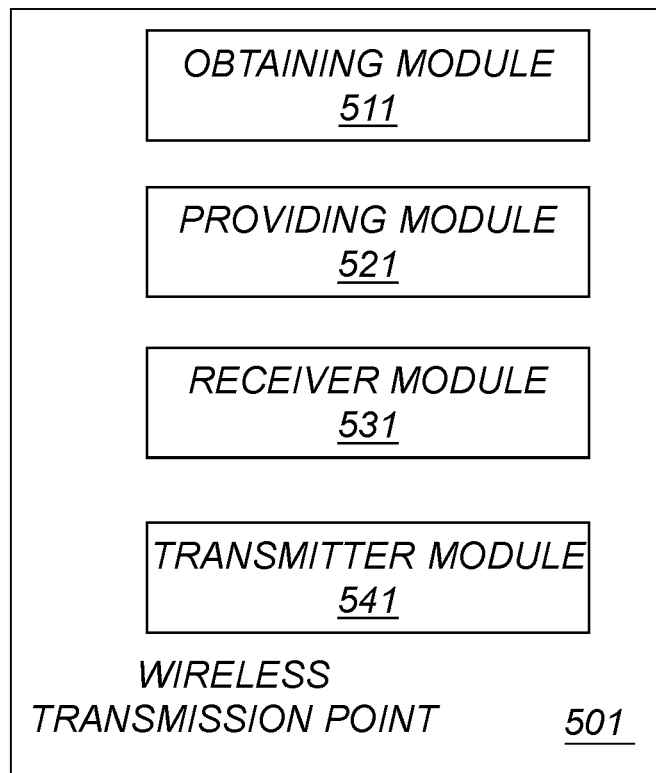
FIG. 25 is a schematic diagram illustrating an embodiment of a wireless transmission point.

FIG. 25 is a schematic diagram illustrating an example of a wireless transmission point 501. The wireless-transmission point comprises an obtaining module 511 for obtaining an air interface rate for a wireless interface between the wireless-transmission point and a user equipment and feedback information associated with sequence numbers of acknowledged data items. The wireless-transmission point further comprises a providing module 521 for providing data representing the air interface rate and the feedback information to a controller node. The wireless-transmission point further comprises a receiver module 531 for receiving data from the controller node according to a rate control signal deduced from the air interface rate and the feedback information. The wireless-transmission point further comprises a transmitter module 541 for performing transmissions of the received data to the user equipment according to the air interface rate.

Alternatively it is possible to realize the module(s) in FIG. 25 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 26:
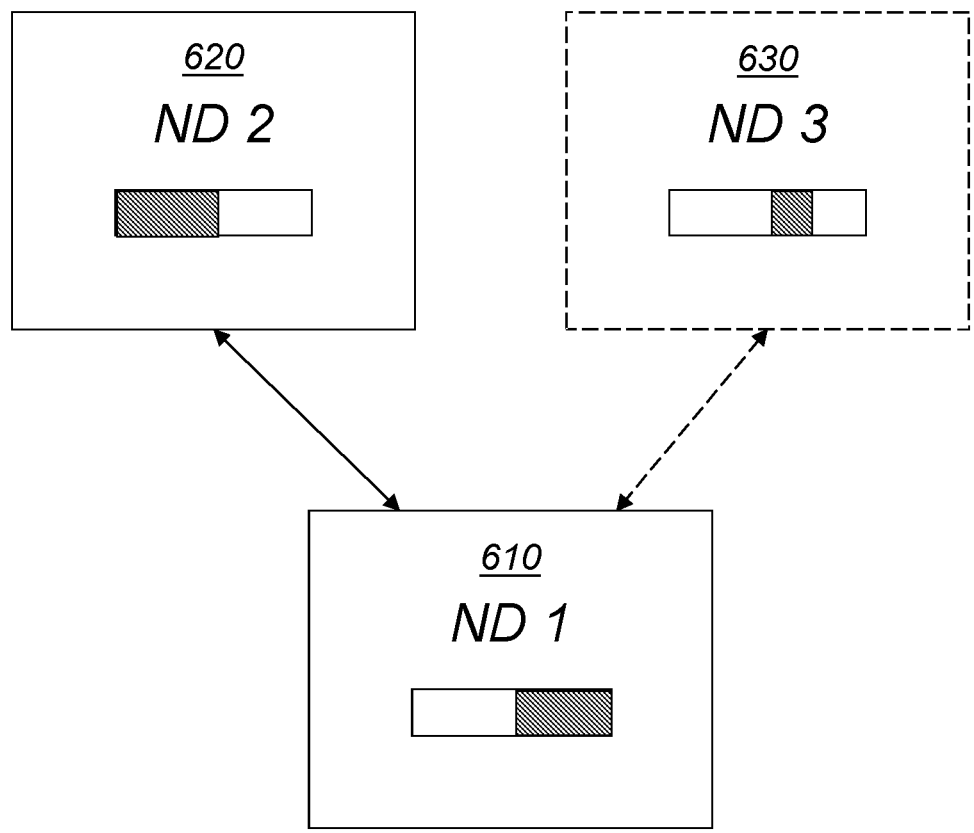
FIG. 26 is a schematic diagram illustrating an example of distributed or partitioned functionality.

FIG. 26 is a schematic diagram illustrating an example of how functionality can be distributed or partitioned between different network devices in a general case. In this example, there are at least two individual, but interconnected network devices, ND1 and ND2, with reference numerals 610 and 620, respectively, which may have different functionalities, or parts of the same functionality, partitioned between the network devices 610 and 620. There may be additional network devices, such as ND3, with reference numeral 630, being part of such a distributed implementation. The network devices 610-630 may be part of the same wireless communication system, or one or more of the network devices may be so-called cloud-based network devices located outside of the wireless communication system.

Figure 27:
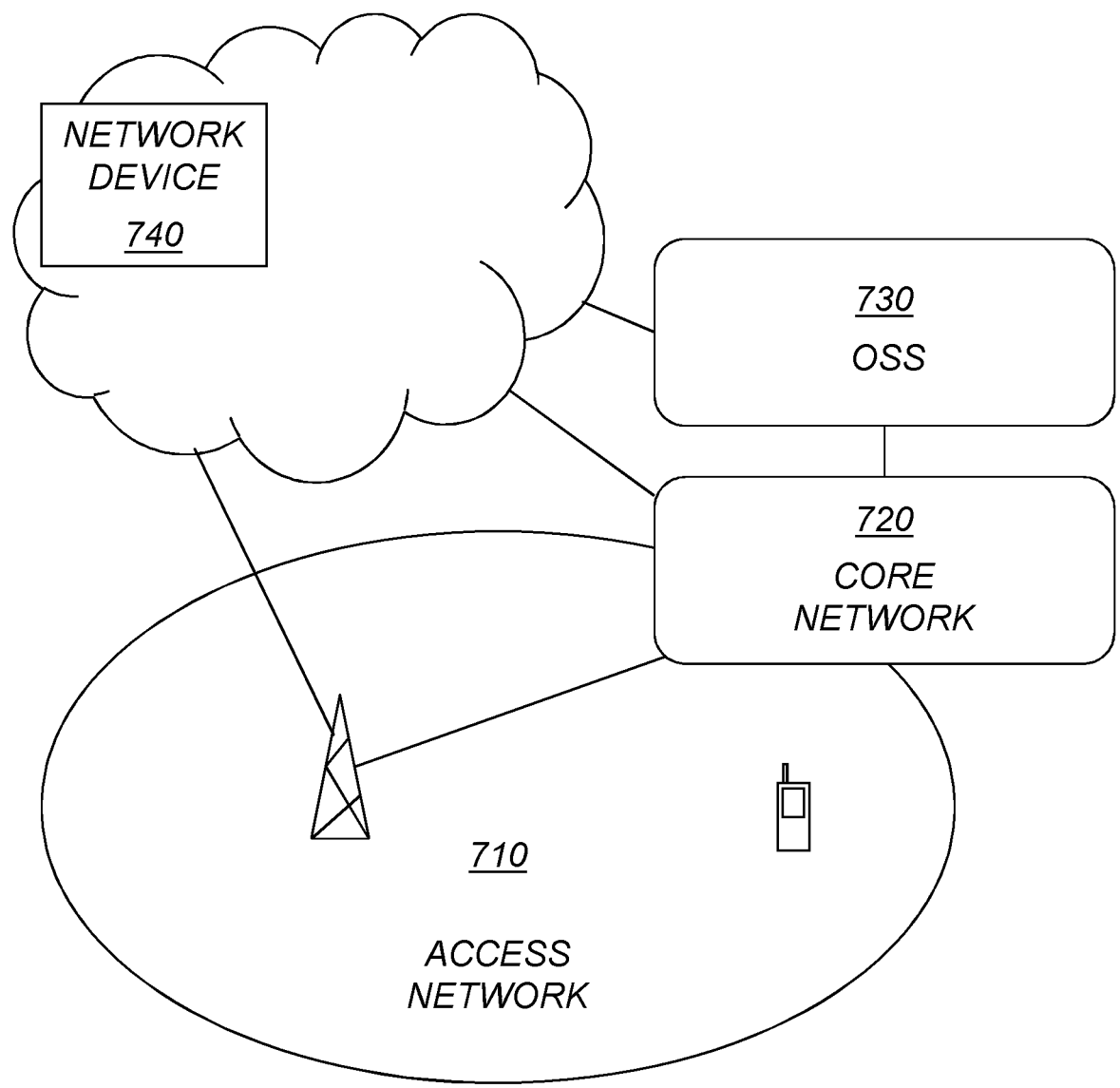
FIG. 27 is a schematic diagram illustrating a wireless communication system in cooperation with one or more cloud-based network devices.

FIG. 27 is a schematic diagram illustrating an example of a wireless communication system, including an access network 710 and/or a core network 720 and/or an Operations and Support System (OSS), 730 in cooperation with one or more cloud-based network devices 740. Functionality relevant for the access network 710 and/or the core network 720 and/or the OSS system 730 may be at least partially implemented for execution in a cloud-based network device 740, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

4G Fourth Generation
5G Fifth Generation
ASIC Application Specific Integrated Circuits
BTS Base Transceiver Stations
CD Compact Disc
C-MTC Critical Machine Type Communications
COTS Common Off-The-Shelf
CPE Customer Premises Equipment
CPU Central Processing Units
DL DownLink
DSP Digital Signal Processors
DVD Digital Versatile Disc
eNB evolved Node B
FPGA Field Programmable Gate Arrays
HDD Hard Disk Drive
HW hardware
I/O input/output
LEE Laptop Embedded Equipment
LME Laptop Mounted Equipment
LTE Long Term Evolution
MEM memory units
ND Network Device
NFV Network Function Virtualization
NI Network Interfaces
NIC Network Interface Controller
NR base station in 5G
OS Operating System
OSS Operations and Support System
PC Personal Computer
PDA Personal Digital Assistant
PLC Programmable Logic Controllers
RAM Random Access Memory
REG registers
ROM Read-Only Memory
RRU Remote Radio Units
RTT Round Trip Time
STA Station
SW software
UE User Equipment
UL UpLink
USB Universal Serial Bus
VM Virtual Machine
VMM Virtual Machine Monitor
VNE Virtual Network Element
VR Virtual Reality
WNIC Wireless Network Interface Controller

APPENDIX A

Automatic Control Terminology

As a start, a number of representations of a dynamic process need to be introduced. A dynamic process is one where the output depends not only on the present input signal but also of previous inputs and outputs. Put otherwise, the dynamic process has memory. The most basic dynamic process is the linear one that can be described by a differential equation as:

$$y^{(n)}(t)+a_1 y^{(n-1)}(t)+ \ldots +a_n y(t)=b_0 u^{(m)}+ \ldots +b_m u(t) \quad (A1)$$

Here y(t) is the output signal, u(t) is the input signal, t is the time, while $a_i$ i=1 . . . n and $b_j$ j=0, . . . , m are constant parameters. (i) denotes differentiation with respect to time i times. The above differential equation has order n. It has one input signal and one output signal. For simplicity all concepts are explained in this context, but the generalization to more than one input signal and more than one input signal is available in prior art textbooks.

By taking Laplace transforms and setting initial values to zero, the differential equation is transformed to be represented by a transfer function H(s), where s denotes the Laplace transform variable which is closely related to the angular frequency used in Fourier transforms. The result is:

$$H(s) = \frac{B(s)}{A(s)} = \frac{b_0 s^m + b_1 s^{m-1} + \ldots + b_m}{s^n + a_1 s^{n-1} + \ldots + a_n}. \quad (A2)$$

The relation between the output signal and input signal Laplace transforms Y(s) and U(s) are:

$$Y(s)=H(s)U(s). \quad (A3)$$

The poles $p_i$ i=1, ..., n of the process are given by the equation A(s)=0. For simplicity only strictly stable (open loop) processes with all poles in the left complex half plane is considered here. In general poles are real or complex conjugate pairs.

The properties of the dynamic process can also be studied in the frequency domain in terms of complex valued frequency functions Y(jω), H(jω) and U(jω). ω denotes the angular frequency that fulfils:

$$\omega=2\pi f, \quad (A4)$$

where f is the frequency in Hz. Below, frequency is used for angular frequency.

Figure 2:
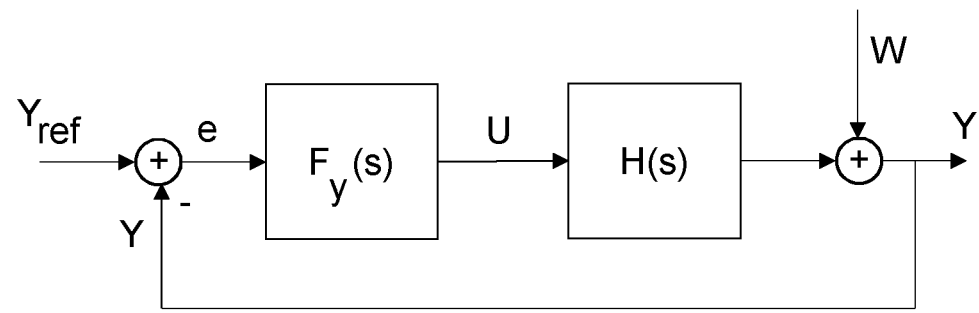
FIG. 2 illustrates a concept of feedback.

Finally, the concept of feedback is illustrated by FIG. 2, where $F_y(s)$ is the feedback gain. The closed loop system is then computed as follows:

$$Y(s)=W(s)+H(s)F_y(s)(Y_{ref}(s)-Y(s)), \quad (A5)$$

which gives:

$$Y(s) = \frac{F_y(s)H(s)}{1+F_y(s)H(s)} Y_{ref}(s) + \frac{1}{1+F_y(s)H(s)} W(s). \quad (A6)$$

This gives the effect of the reference signal and the disturbance on the output.

e denotes control error.

The remaining definitions now follow as:

The closed loop bandwidth $\omega_{CL}$ of the control system is given by the equation:

$$\left|\frac{F_y(j\omega_{CL})H(j\omega_{CL})}{1+F_y(j\omega_{CL})H(j\omega_{CL})}\right|^2 = \frac{1}{2}\left|\frac{F_y(0)H(0)}{1+F_y(0)H(0)}\right|^2. \quad (A7)$$

The closed loop static error of the control system is given by the equation:

$$y_{ref} - y = \frac{1}{1+F_y(0)H(0)}(y_{ref} - w). \quad (A8)$$

The static disturbance rejection of the control system is given by the static sensitivity function:

$$S(0) = \frac{1}{1+F_y(0)H(0)}. \quad (A9)$$

The dynamic disturbance rejection of the control system is determined by the sensitivity function:

$$S(j\omega) = \frac{1}{1+F_y(j\omega)H(j\omega)}. \quad (A10)$$

The complimentary sensitivity function of the control system, T(jω)=1−S(jω) determines the robustness of the control system with respect to un-modelled dynamics.

In the technology present herein, global stability will be engineered by means of so called input-output stability, in particular so called $L_2$-stability. This type of stability is characterized by signals f(t) fulfilling the $L_2$-norm condition:

$$\|f(\bullet)\|_2^2 = \int_0^\infty |f(t)|^2 dt < \infty. \quad (A11)$$

If it can be determined that all internal signals fulfil this property, then it follows that they have finite integrals, and are therefore finite in this sense.

It is well known in prior art that stability of linear dynamic systems with a nonlinearity in the loop can be analyzed by the so called Popov criterion. This criterion is valid for the feedback system of FIG. 3.

Figure 3:
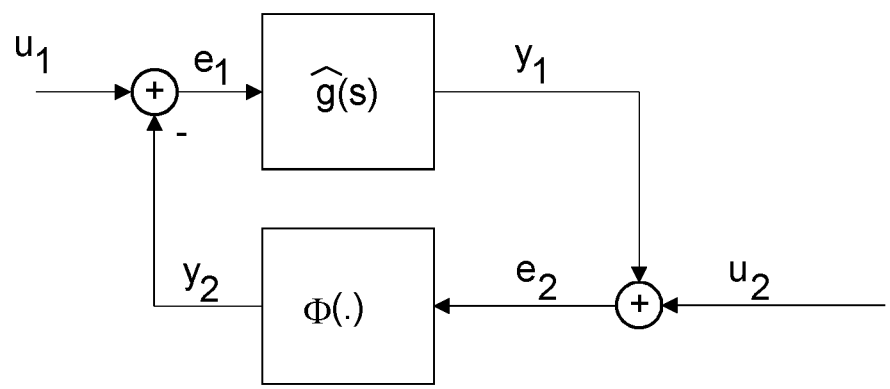
FIG. 3. illustrates a feedback block diagram for which the Popov criterion is valid.

In FIG. 3 ĝ(s) denotes the loop gain, Φ(•) the static nonlinearity, $u_1$ and $u_2$ external signals affecting the feedback system, $e_1$ and $e_2$ internal error signals, while $y_1$ and $y_2$ denote internal signals. The Popov criterion is then given by:

The Popov criterion: Assume that $u_1$, $u_2$ and $du_2/dt$ belong to $L_2$, and that $$\hat{g}(j\omega) \xrightarrow[\omega\to\infty]{} 0.$$

Then the feedback system of FIG. 2 is $L_2$-stable if there exists a q>0 such that $$\text{Re}[(1+jq\omega)\hat{g}(j\omega)] + \frac{1}{k} > 0, \quad (A12)$$

for all $\omega \geq 0$, where k is the maximum slope of the static nonlinearity Φ(•), that fulfils the sector condition:

$$0 \leq \sigma \Phi(\sigma) \leq k\sigma^2. \quad (A13)$$

This result will be used to engineer in stability in the feedback control scheme of the present technology.

The graphical interpretation of this criterion is that if the Popov curve Re[ĝ(jω)]+jωIm[ĝ(jω)] lies to the right of any line through the pivot point −1/k+j0 with positive slope, then the closed loop system is $L_2$-stable.

REFERENCES

D. Sandberg and T. Wigren, "Multi-rate uplink channel prediction and enhanced link adaptation for VoLTE", Proc. VTC 2015 Fall, Boston, Ma, Sep. 6-9, 2015.

The invention claimed is:

1. A method for assisting in multipoint data flow control in a wireless communication system having a number, n+1, where n≥1, of wireless-transmission points, wherein said method comprising:
    obtaining, for each of said wireless-transmission points, a round trip time of a present sampling period for data travelling to a user equipment via a respective wireless-transmission point and an acknowledge message travelling back via said respective wireless-transmission point;
    selecting one of said wireless-transmission points as a reference wireless-transmission point;
    computing a round trip time skew for said present sampling period for individual wireless-transmission points except for said reference wireless-transmission point, wherein the round trip time skew being a difference between said obtained round trip time of a respective individual wireless-transmission point and said obtained round trip time of said reference wireless-transmission point;

providing a reference round trip time value for each of said wireless-transmission points in dependence of a respective computed round trip time skew; and generating, for each of said wireless-transmission points, a rate control signal for rate of data flow in dependence of a respective reference round trip time value.

2. A controller node configured to assist in multipoint data flow control in a wireless communication system having a number, n+1, where n≥1, of wireless-transmission points, the controller node comprising:

at least one processor; and a memory containing instructions which, when executed by the at least one processor cause the controller node to perform operations to:

obtain, for each of said wireless-transmission points, a round trip time of a present sampling period for data travelling to a user equipment via a respective wireless-transmission point and an acknowledge message travelling back via said respective wireless-transmission point;

select one of said wireless-transmission points as a reference wireless-transmission point;

compute a round trip time skew for said present sampling period for individual wireless-transmission points except for said reference wireless-transmission point, wherein the round trip time skew being a difference between said obtained round trip time of a respective individual wireless-transmission point and said obtained round trip time of said reference wireless-transmission point;

provide a reference round trip time value for each of said wireless-transmission points in dependence of a respective computed round trip time skew; and generate, for each of said wireless-transmission points, a rate control signal for rate of data flow in dependence of a respective reference round trip time value.

3. The controller node according to claim 2, wherein the instructions cause the controller node to further perform operations to provide said reference round trip time value for said wireless-transmission points under a constraint of controlling each of said round trip time skews towards zero.

4. The controller node according to claim 2, wherein the instructions cause the controller node to further perform computation of a sum of said round trip times of said wireless-transmission points for said present sampling period, and to provide said reference round trip time value in further dependence of said computed sum of said round trip times.

5. The controller node according to claim 4, wherein the instructions cause the controller node to further perform operations to set a reference value for said computed sum of said round trip times, and to provide said reference round trip time value under a constraint of controlling said sum of said round trip times towards said reference value.

6. The controller node according to claim 5, wherein the instructions cause the controller node to further perform operations to refrain from controlling said sum of said round trip times when said sum of said round trip times lies within a predefined deadzone for said reference value for said computed sum of said round trip times.

7. The controller node according to claim 4, when performing operations to provide said reference round trip time value for each of said wireless-transmission points, the instructions cause the controller node to further perform operations to:

transfer said computed round trip time skews into filtered round trip time skew errors;

transfer said computed sum of said round trip times into a filtered sum of round trip times error; and combine said filtered round trip time skew errors and said filtered sum of round trip times error into said reference round trip time values by a combining matrix (M).

8. The controller node according to claim 7, wherein said combining matrix is a matrix statically decoupling the respective reference round trip time values.

9. The controller node according to claim 7, when performing operations to combine said filtered round trip time skew errors and said filtered sum of round trip times error into said reference round trip time value, the instructions cause the controller node to further perform operations to set positive output values of said combining matrix as said reference round trip time values and to adjust negative output values of said combining matrix into zero reference round trip time values.

10. The controller node according to claim 4, when performing operations to generate for each of said wireless-transmission points said rate control signal, the instructions cause the controller node to further perform operations to:

receive data representing an air interface rate for a wireless interface of a respective wireless-transmission point;

calculate a reference number of data items in flight by multiplying said reference round trip time value with said air interface rate;

receive feedback information from a respective wireless-transmission point;

estimate a number of data items in flight in dependence on said feedback information; and compare said reference number of data items in flight with said estimated number of data items in flight;

wherein said rate control signal is generated in dependence on said comparison of said reference number of data items in flight with said estimated number of data items in flight.

11. The controller node according to claim 10, when performing operations to estimate a number of data items in flight, the instructions cause the controller node to further perform operations to:

obtain a sequence number of a latest acknowledged data item from said feedback information;

obtain a sequence number representing the latest data item provided to said respective wireless-transmission point; and compute a difference between said sequence number representing the latest data item provided to said respective wireless-transmission point and said sequence number of a latest acknowledged data item from said feedback information as said number of data items in flight.

12. The controller node according to claim 2, wherein the instructions cause the controller node to further provide rate control signals regularly with a constant sampling period.

13. The controller node according to claim 2, wherein the instructions cause the controller node to further perform operations to transmit data to each of said wireless-transmission points according to respective rate control signal.

14. A non-transitory computer-readable storage medium having stored thereon a computer program which, when executed by at least one processor, causes a multipoint data flow control in a wireless communication system having a number, n+1, where n≥1, of wireless-transmission points, to perform operations comprising:
- obtaining, for each of said wireless communication points, a round trip time of a present sampling period for data travelling to a user equipment via a respective wireless-transmission point and an acknowledge message travelling back via said respective wireless-transmission point;
- selecting one of said wireless-transmission points as a reference wireless-transmission point;
- computing a round trip time skew for said present sampling period for individual wireless-transmission points except for said reference wireless-transmission point, wherein the round trip time skew being a difference between said obtained round trip time of a respective individual wireless-transmission point and said obtained round trip time of said reference wireless-transmission point;
- providing a reference round trip time value for each of said wireless-transmission points in dependence of a respective computed round trip time skew; and
- generating, for each of said wireless-transmission points, a rate control signal for rate of data flow in dependence of a respective reference round trip time value.

\* \* \* \* \*